(12) United States Patent
Okamura

(10) Patent No.: US 12,395,034 B2
(45) Date of Patent: Aug. 19, 2025

(54) ROTARY ELECTRIC MACHINE, STATOR THEREOF AND MANUFACTURING METHOD OF ROTARY ELECTRIC MACHINE

(71) Applicant: DENSO CORPORATION, Kariya (JP)

(72) Inventor: Tomoyuki Okamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 651 days.

(21) Appl. No.: 17/197,864

(22) Filed: Mar. 10, 2021

(65) Prior Publication Data

US 2021/0194309 A1 Jun. 24, 2021

Related U.S. Application Data

(63) Continuation of application No. PCT/JP2019/027830, filed on Jul. 15, 2019.

(30) Foreign Application Priority Data

Sep. 13, 2018 (JP) .................. 2018-171801

(51) Int. Cl.
*H02K 3/50* (2006.01)
*H02K 3/38* (2006.01)
*H02K 15/12* (2025.01)
*H02K 15/32* (2025.01)

(52) U.S. Cl.
CPC ............... *H02K 3/50* (2013.01); *H02K 15/12* (2013.01); *H02K 15/32* (2025.01); *H02K 3/38* (2013.01); *H02K 2203/09* (2013.01)

(58) Field of Classification Search
None
See application file for complete search history.

(56) References Cited

U.S. PATENT DOCUMENTS

| | | | |
|---|---|---|---|
| 6,181,044 B1 | 1/2001 | Umeda et al. | |
| 2003/0201688 A1* | 10/2003 | Yamamura | H02K 3/522 310/71 |
| 2012/0286593 A1 | 11/2012 | Yokogawa et al. | |
| 2012/0293024 A1* | 11/2012 | Yokogawa | H02K 3/522 310/43 |
| 2012/0293967 A1* | 11/2012 | Borghoff | H01L 25/072 361/747 |
| 2016/0020658 A1 | 1/2016 | Tamura | |
| 2017/0250585 A1* | 8/2017 | Ohashi | H02K 3/522 |
| 2020/0280235 A1* | 9/2020 | Natsumeda | H02K 3/325 |

FOREIGN PATENT DOCUMENTS

| | | | | |
|---|---|---|---|---|
| DE | 102018103727 A1 | * | 9/2018 | |
| JP | 2008312393 A | * | 12/2008 | ........... H02K 3/522 |
| JP | 2018-125924 A | | 8/2018 | |

OTHER PUBLICATIONS

Machine translation of DE-102018103727-A1 (Year: 2018).*
Machine translation of JP-2008312393-A (Year: 2008).*

* cited by examiner

*Primary Examiner* — Oluseye Iwarere
*Assistant Examiner* — Minki Chang
(74) *Attorney, Agent, or Firm* — Oliff PLC

(57) ABSTRACT

A rotary electric machine has a rotor and a stator. The stator comprises a stator coil. The stator coil has a bus bar made of a conductive member that is electrically connected to a coil terminal included in a coil end. The stator has a holder which accommodates the bus bar and is made of an insulating member. The holder is positioned so that the opening or the resin member faces towards the stator core.

16 Claims, 13 Drawing Sheets

US 12,395,034 B2

ROTARY ELECTRIC MACHINE, STATOR THEREOF AND MANUFACTURING METHOD OF ROTARY ELECTRIC MACHINE

CROSS REFERENCE TO RELATED APPLICATIONS

The present application is a continuation application of International Patent Application No. PCT/JP2019/027830 filed on Jul. 15, 2019, which designated the U.S. and claims the benefit of priority from Japanese Patent Application No. 2018-171801 filed in Japan filed on Sep. 13, 2018, the entire disclosure of the above application is incorporated herein by reference.

TECHNICAL FIELD

The disclosure in this specification relates to a rotary electric machine, a stator thereof, and a manufacturing method of the rotary electric machine.

BACKGROUND

A rotary electric machine may have at least one electrical conductive member to provide at least one electrical connection. It is required to keep electrical insulation of the conductive member. In the above aspects, or in other aspects not mentioned, there is a need for further improvements in a rotary electric machine, a stator thereof, and a manufacturing method of the rotary electric machine.

SUMMARY

A disclosed stator of a rotary electric machine, comprised: a stator core which provides a plurality of slots; and a stator coil mounted on a stator core, wherein the stator coil includes: a coil end positioned at an end of the stator core; a bus bar made of a conductive member electrically connected to a coil terminal included in the coil end; a holder which is a container made of an insulating member for accommodating the bus bar, is arranged in an axial direction of the stator core, and has an opening facing the stator core.

According to the stator of the rotating electric machine disclosed, the holder is positioned so that the opening faces the stator core. As a result, the wall surface of the holder is positioned on the outside of the stator core. This improves insulation performance.

The rotary electric machine disclosed herein includes the stator of the rotary electric machine, a rotor magnetically coupled to the stator, and a housing that accommodates the stator and the rotor and faces the wall surface of the holder.

A disclosed manufacturing method of a rotary electric machine comprises: mounting a stator coil on a stator core providing a plurality of slots; positioning the coil end at an end of the stator core; assembling a bus bar unit by mounting a bus bar made of a conductive member from an opening of a holder made of an insulating member; positioning the bus bar unit so that the opening faces an axial end of the stator core; electrically connecting the coil terminal included in the coil end and the bus bar; and positioning a housing in a radial direction outside and/or an axial direction outside of a wall of the holder.

According to the manufacturing method of the rotary electric machine disclosed herein, the housing is positioned on an outside in the radial direction and/or an outside in the axial direction of the wall of the holder. This improves insulation performance.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

BRIEF DESCRIPTION OF DRAWINGS

The disclosure is further described with reference to the accompanying drawings in which.

DETAILED DESCRIPTION

Figure 1:
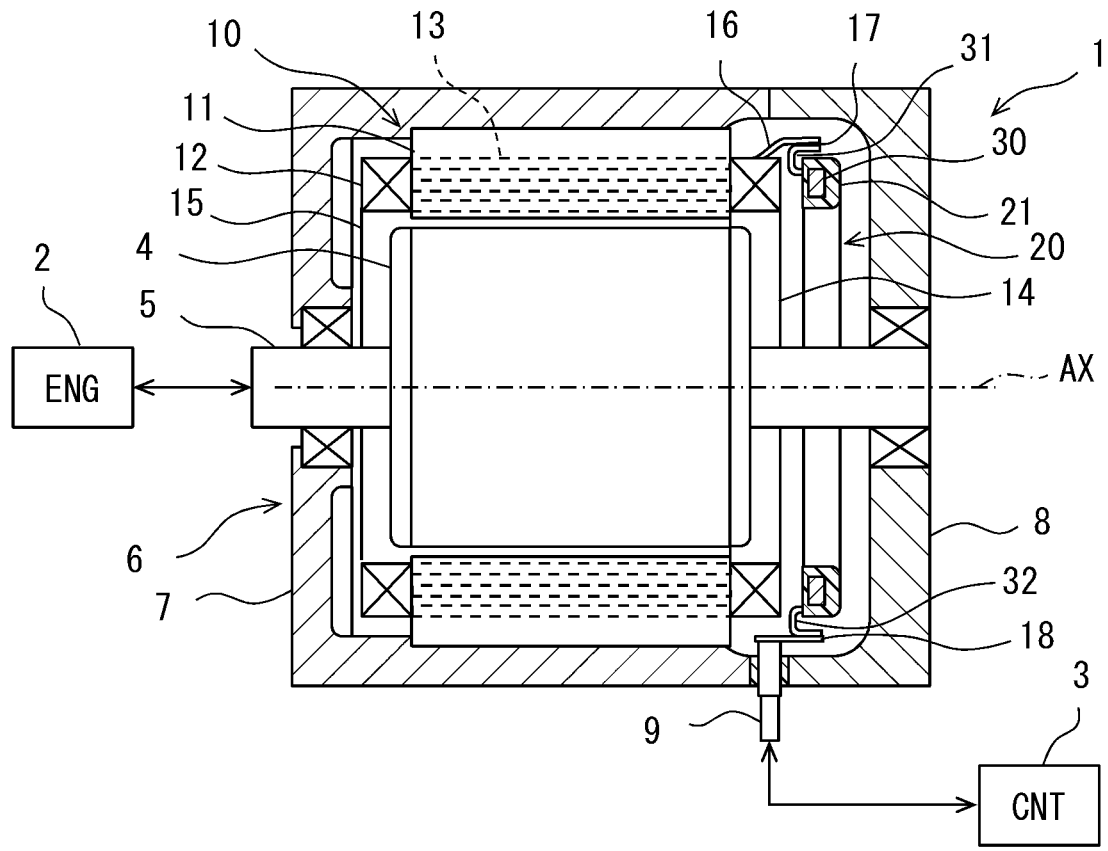
FIG. 1 is a cross-sectional view of a rotary electric machine according to a first embodiment.

Patent Literature 1: JP2017-153261A, Patent Literature 2: JP2000-166150A, and Patent Literature 3: JP2018-125924A disclose a stator of a rotary electric machine. The contents of literatures are incorporated by reference as explanation of technical elements in this specification.

These stators have a variety of coil ends. In particular, Patent Literature 1 discloses a holder accommodating a plurality of bus bars. The plurality of bus bars provide connecting members at a coil end. The plurality of bus bars are fixed to the holder by an adhesive resin. In the above-mentioned configuration, bubbles may be generated in the adhesive resin. In addition, the bubbles can become pinholes. Bubbles and pinholes may impair insulation performance. From another view point, the adhesive resin may be more easily damaged than the holder.

It is an object disclosed to provide a rotary electric machine, a stator thereof, and a manufacturing method of the rotary electric machine which have improved insulation performance. It is another object disclosed to provide a rotary electric machine, a stator thereof, and a manufacturing method of the rotary electric machine which have improved insulation performance for a plurality of bus bars. It is yet another object disclosed to provide a rotary electric machine, a stator thereof, and a manufacturing method of the rotary electric machine which have improved insulation performance between a housing and a bus bar.

Hereinafter, a plurality of embodiments are described with reference to the drawings. In some embodiments, functionally and/or structurally corresponding and/or associated parts may be given the same reference numerals, or reference numerals with different digit placed on equal to or higher than a hundred place. For corresponding parts and/or associated parts, it is possible to make reference to the description of other embodiments.

First Embodiment

In FIG. 1, the rotary electric machine 1 is a motor generator. The rotary electric machine 1 is operatively connected to the internal combustion engine 2 (ENG). The internal combustion engine 2 provides power for various devices. In this specification, the devices may include a vehicle, an air conditioner, a pumping device, or the like. Furthermore, the term vehicle includes a car, a ship, an aircraft, a simulation device, and an amusement device.

The rotary electric machine 1 is electrically connected to the control device 3 (CNT). The control device 3 includes an inverter circuit. The rotary electric machine 1 is driven by the internal combustion engine 2 and outputs electric power, when functioning as a generator. The control device 3 functions as a rectifier circuit that rectifies the electric power output from the rotary electric machine 1 when the rotary electric machine 1 is used as a generator. The rotary electric machine 1 may assist a rotation of the internal combustion engine 2 when functioning as an electric motor. The control device 3 supplies multiphase AC power to the rotary electric machine 1 when the rotary electric machine 1 is used as an electric motor. In this embodiment, the multiphase AC power is three-phase power.

The control device 3 is an electronic control unit. The control device 3 provides a control system. The control system has at least one arithmetic processing unit (CPU) and at least one memory device (MMR) as a storage medium for storing programs and data. The control system is provided by a microcomputer comprising a computer readable storage medium. The storage medium is a non-transitional tangible storage medium that non-temporarily stores a computer readable program. The storage medium may be provided as a semiconductor memory, a magnetic disk, or the like. The control system may be provided by one computer or a group of computer resources linked via a data communication device. Means and/or functions provided by the control system can be provided by software recorded in a substantive memory device and a computer that can execute the software, software only, hardware only, or some combination of them. For example, the control system can be provided by a logic called if-then-else type, or a neural network tuned by machine learning. Alternatively, for example, if the control system is provided by an electronic circuit that is hardware, the control system may be provided by a digital circuit or an analog circuit that includes a large number of logic circuits.

The rotary electric machine 1 has a rotor 4 and a stator 10. The rotor 4 is rotatable around an axis AX. The stator 10 is a cylindrical shape having the axis AX. In the following description, terms of an axial direction, a radial direction, and a circumferential direction are defined based on the axis AX. The rotor 4 and the stator 10 are accommodated in a housing 6. The housing 6 fixes the stator 10 and supports the rotor 4 in a rotatable manner. The housing 6 may provide components for the internal combustion engine 2. For example, the housing 6 may provide a part of a crankcase or a part of a transmission case. The housing 6 has a first housing 7 with a bottomed cylindrical shape and a second housing 8 with a bottomed cylindrical shape. The rotor 4 and the stator 10 are housed between a first housing 7 and a second housing 8.

The rotor 4 is magnetically coupled with the stator 10. The rotor 4 is supported by a shaft 5 so as to be rotatable with respect to the housing 6. The shaft 5 provides a rotational shaft. The rotational shaft is connected to the internal combustion engine 2. The rotor 4 is disposed in a radial direction inside of the stator 10. The rotor 4 has a plurality of magnetic poles arranged along the circumferential direction. The plurality of magnetic poles are formed by a plurality of permanent magnets embedded in the rotor 4. The rotor 4 can be provided by various structures. The rotor 4 has, for example, 8 magnetic poles, i.e., N pole: 4 pieces and S pole: 4 pieces.

The rotary electric machine 1 has a power terminal member 9. The rotary electric machine 1 has a plurality of power terminal members 9. The power terminal member 9 is a terminal for electrically connecting the rotary electric machine 1 and the control device 3. The power terminal member 9 is used as an output terminal member when outputting electric power, and as an input terminal member when receiving electric power. The power terminal member 9 can also be called an external connection terminal member of the rotary electric machine 1.

The stator 10 has a stator core 11. The stator core 11 is a cylindrical shape. The stator core 11 is an annular shape. The stator core 11 has a plurality of steel plates laminated along the axial direction. The stator core 11 has a plurality of slots arranged in the circumferential direction. The plurality of slots are arranged at an equal pitch with respect to the circumferential direction. The plurality of slots may be arranged at several different pitches. The plurality of slots extend in the axial direction so as to penetrate the plurality of steel plates. Further, the plurality of slots extend in the radial direction. A typical stator core 11 has an annular back core. The stator core 11 has a plurality of teeth extending out in the radial direction inside from the back core. The plurality of teeth form a plurality of slots between them. For example, the stator core 11 has 48 slots.

The stator 10 has a stator coil 12. The stator coil 12 is attached to the stator core 11. The stator coil 12 has straight portions 13 and coil ends 14 and 15. The straight portion 13 extends straight. The straight portion 13 is housed in the slot. The coil ends 14 and 15 are positioned at ends of the stator core 11. The coil ends 14 and 15 protrude from the stator core 11 in the axial direction. The coil ends 14 and 15 are bundles of a plurality of conductors included in the stator coil 12. At the coil ends 14 and 15, one conductor connects one straight portion 13 positioned in one slot to one straight portion 13 positioned in another different slot. The coil ends 14 and 15 may be provided by continuous turn portions of the conductor. The coil ends 14 and 15 may be provided by joint portions joining different conductors. These examples are disclosed in Patent Literature 2: JP2000-166150A or Patent Literature 3: JP2018-125924A.

The stator coil 12 has coil terminals 16. The coil terminals 16 are leader wires extending from the coil end 14. The stator coil 12 includes a plurality of coil terminals 16. The coil terminals 16 provide both ends of a plurality of coils as multiphase windings. In this embodiment, since the three-phase winding is provided, at least six coil terminals 16 are provided. Further, in this embodiment, one phase is provided by the parallel connection of (n) coils. Therefore, the stator coil 12 has a (6×n) coil terminals 16. In this embodiment, one phase is provided by the parallel connection of four coils. Therefore, the stator coil 12 includes 24 coil terminals 16.

One coil can be provided by a continuous wire or by joining multiple segments. In this embodiment, a single coil is provided by a plurality of joined segments. Note that the plurality of segments can be joined by various joining methods. As a joining method, for example, TIG welding, electric resistance welding, solder joining, or the like can be used. In addition, one coil is a coil that can be regarded as one phase. One coil may include a plurality of coil elements having different electrical angles. For example, one coil can include a plurality of coil elements having electrical angles that differ by several degrees.

The stator coil 12 has a bus bar unit 20. The bus bar unit 20 electrically connects the stator coil 12 so as to form a multiphase connection. The bus bar unit 20 connects a plurality of coil terminals 16 to provide a star connection or a delta connection. In this embodiment, the bus bar unit 20 provides the star connection. The bus bar unit 20 includes a plurality of bus bars 30. The plurality of bus bars 30 are made of conductive members. The bus bar unit 20 has end bus bars that provide three input or output terminals, i.e., power terminals in the star connection. The bus bar unit 20 has a neutral point bus bar that provides a neutral point in the star connection.

The bus bar unit 20 has a holder 21. The holder 21 is made of an insulating material. The holder 21 has an arc shape. The holder 21 may be a polyhedron. The holder 21 may be annular. The holder 21 is arranged along the coil end 14. The holder 21 is arranged outer side than the coil end 14 in the axial direction. In addition, at least a portion of the holder 21 is arranged outer side than the coil end 14 in the radial direction. The holder 21 faces a corner of the outside in the radial direction of the coil end 14. The holder 21 is a container for accommodating the bus bar 30 in an inside.

In FIG. 1, a plurality of bus bars 30 are exemplified as one bus bar 30. In FIG. 1, the inside of the holder 21 is schematically shown. The plurality of bus bars 30 provide a plurality of dispersive terminal members 31. The dispersive terminal members 31 are also called coil connection terminals. The dispersive terminal members 31 extend from the holder 21. The dispersive terminal member 31 has a shape that can be called a J-shape or a U-shape. The dispersive terminal member 31 extends toward the coil end 14 in the axial direction from the holder 21, then extends outward in the radial direction, and further extends in the axial direction along the radial direction outside of the holder 21. The plurality of dispersive terminal members 31 are electrically connected to the plurality of coil terminals 16. The plurality of dispersive terminals 31 are electrically connected to the plurality of coil terminals 16 in the radial direction outside of the holder 21. The coil terminals 16 and the dispersive terminal members 31 are electrically connected at joint portions 17. The joint portion 17 can be provided by various joining methods. As a joining method, for example, TIG welding, electric resistance welding, solder joining, or the like can be used.

The plurality of bus bars 30 provide a plurality of collective terminal members 31. The collective terminal member 32 is also called a power connection terminal member. The plurality of collective terminal members 32 are electrically connected to the plurality of power terminal members 9. The collective terminal member 32 extend from the holder 21. The collective terminal member 32 has a shape that can be called a J-shape or a U-shape. The collective terminal member 32 extends towards the coil end 14 in the axial direction from the holder 21, then extends outward in the radial direction, and further extends in the axial direction along the radial direction outside of the holder 21. The plurality of collective terminal members 32 are electrically connected to the plurality of power terminal members 9 in the radial direction outside of the holder 21. The collective terminal member 32 and the power terminal member 9 are electrically connected at the joint portion 18. The joint portion 18 can be provided by various joining methods. As a joining method, for example, TIG welding, electric resistance welding, solder joining, or the like can be used.

Figure 2:
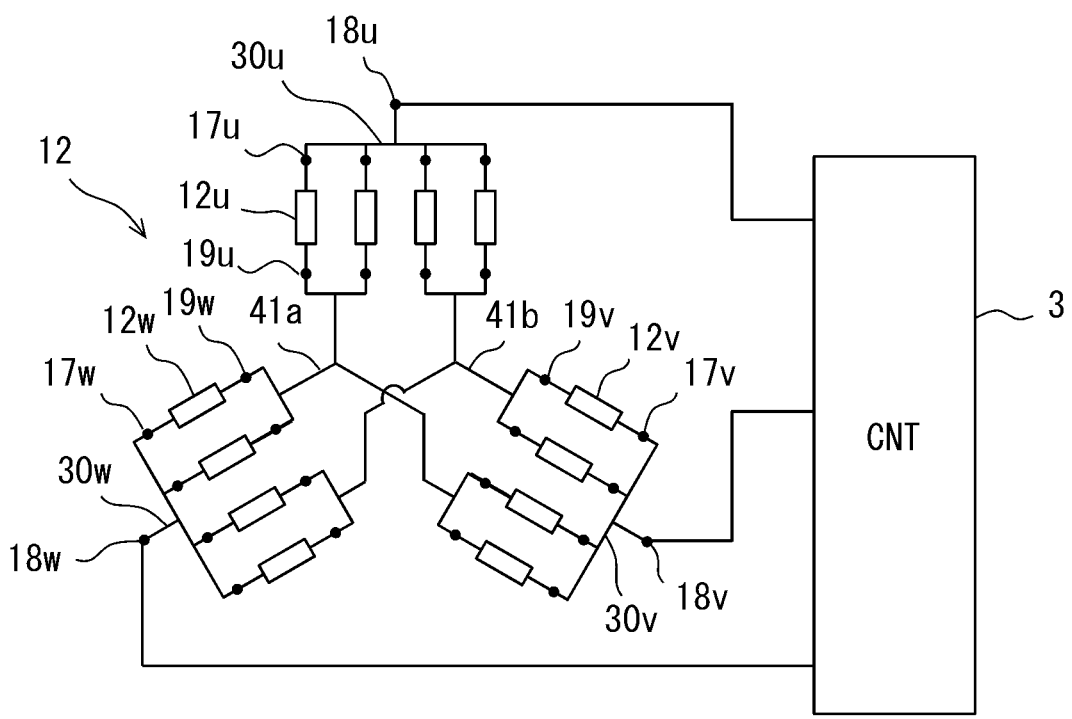
FIG. 2 is a circuit diagram of a stator coil.

FIG. 2 shows a multi-phase connection of the stator coil 12. The stator coil 12 employs the star connection as a multi-phase connection. The stator coil 12 has a U phase, a V phase, and a W phase. The stator coil 12 has a plurality of U-phase coils 12u that provide U-phase. The stator coil 12 has a plurality of V-phase coils 12v that provide V-phase. The stator coil 12 has a plurality of W-phase coils 12w that provide W-phase. In this embodiment, the stator coil 12 has four U-phase coils 12u, four V-phase coils 12v, and four W-phase coils 12w.

The plurality of bus bars 30 have a U-phase bus bar 30u that provides a U-phase power terminal. The U-phase bus bar 30u has four dispersive terminal members 31. The U-phase bus bar 30u is connected to each of the four U-phase coils 12u at the four joint portions 17u. The U-phase bus bar 30u is connected to the power terminal member 9 at the joint portion 18u. Therefore, the U-phase bus bar 30u provides a so-called crossover wire that connects four U-phase coils 12u to the power terminal.

The plurality of bus bars 30 have a V-phase bus bar 30v that provides a V-phase power terminal. The V-phase bus bar 30v has four dispersive terminal members 31. The V-phase bus bar 30v is connected to each of the four V-phase coils 12v at the four joint portions 17v. The V-phase bus bar 30u is connected to the power terminal member 9 at the joint portion 18v. Therefore, the V-phase bus bar 30v provides a so-called crossover wire that connects four V-phase coils 12v to the power end.

The plurality of bus bars 30 have a W-phase bus bar 30w that provides a W-phase power terminal. The W-phase bus bar 30w has four dispersive terminal members 31. The W-phase bus bar 30w is connected to each of the four W-phase coils 12w at the four joint portions 17w. The W-phase bus bar 30u is connected to the power terminal member 9 at the joint portion 18w. Therefore, the W-phase bus bar 30w provides a so-called crossover wire that connects four W-phase coils 12w to the power end.

The plurality of bus bars 30 have a plurality of neutral point bus bars 41. The two neutral point bus bars 41a and 41b provide two star connections. One neutral point bus bar 41a has six terminal members. Two neutral point bus bars 41a and 41b provide twelve terminal members. The neutral point bus bar 41a is joined to the coil terminals for the neutral point at two joint portions 19*u*, two joint portions 19*v*, and two joint portions 19*w*. The neutral point bus bar 41*b* is connected to the coil terminals for the neutral point at two joint portions 19*u*, two joint portions 19*v*, and the two joint portions 19*w*.

Figure 3:
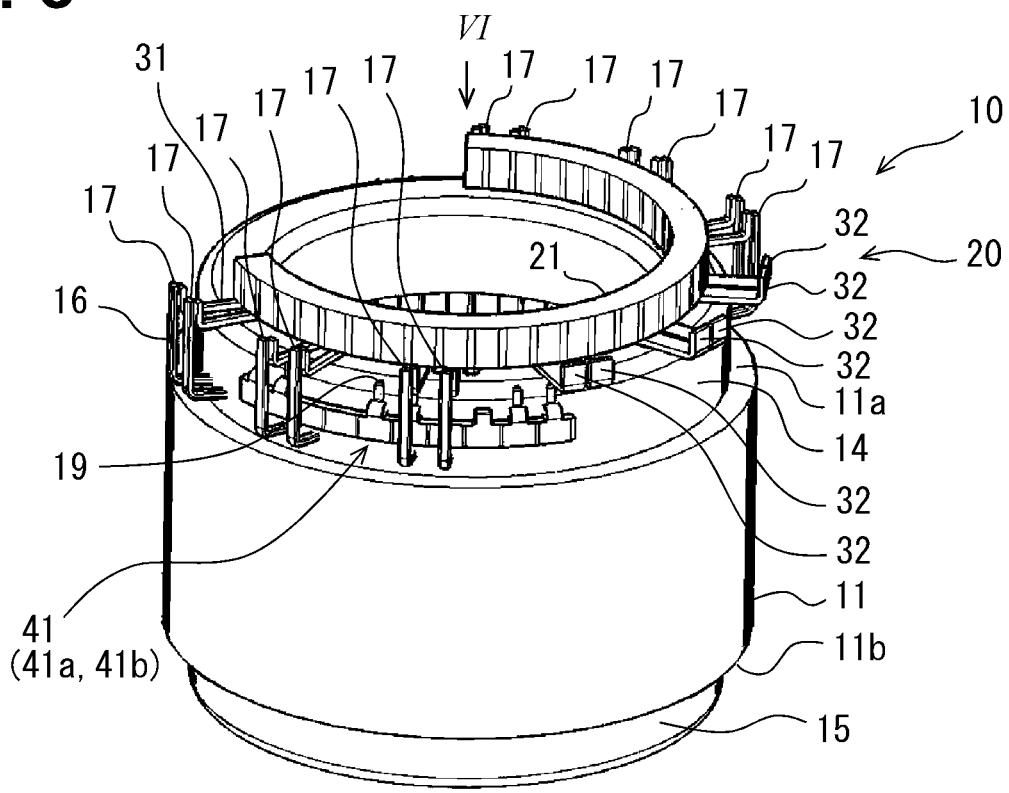
FIG. 3 is a perspective view of a stator.

FIG. 3 shows an appearance of one end of the stator 10. The stator core 11 has one end surface 11*a* and the other end surface 11*b*. The coil end 14 extends in the axial direction from one end surface 11*a*. The coil end 14 extends in the axial direction from the other one end surface 11*b*. The bus bar unit 20 is positioned in the axial direction of the coil end 14. The bus bar unit 20 is positioned in a predetermined angle range including the angle range in which the power terminal members 9 is positioned. The holder 21 is positioned away from the coil end 14 with respect to the axial direction.

In the drawings, 12 joint portions 17 are shown. One joint portion 17 electrically connects one coil terminal 16 and one dispersive terminal member 31. The coil terminal 16 is L-shaped. The coil terminals 16 are drawn out from the radial direction outside surface of the coil end 14. The coil terminals 16 extend towards the axial direction outside from the coil end 14. The dispersive terminal member 31 extends towards the radial direction outside from the holder 21 and then extends in the axial direction outside at the radial direction outer end. The coil terminals 16 and the dispersive terminal members 31 both form the joint portion 17 at end portions extending along the axial direction.

The stator 10 has six collective terminal members 32. A group of collective terminal members 32, i.e., two collective terminal members 32 adjacent to each other in a short distance with respect to the circumferential direction provide substantially one collective terminal member 32 of one bus bar. The three groups of collective terminal members 32 provide the power terminals for the U-phase, the V-phase, and the W-phase. In other words, the bus bar unit 20 has 3 groups and 6 collective terminal members 32.

The bus bar unit 20 has a neutral point bus bar 41. The neutral point bus bar includes a plurality of neutral point bus bars 41*a* (41*b*). The neutral point bus bar 41*a* (41*b*) is independent of the holder 21. The neutral point bus bar 41*a* (41*b*) is arranged along the coil end 14 in the radial direction outside of the coil end 14. The neutral point bus bar 41*a* and the neutral point bus bar 41*b* are arranged in the radial direction outside of the coil end 14 so as not to overlap each other.

Figure 4:
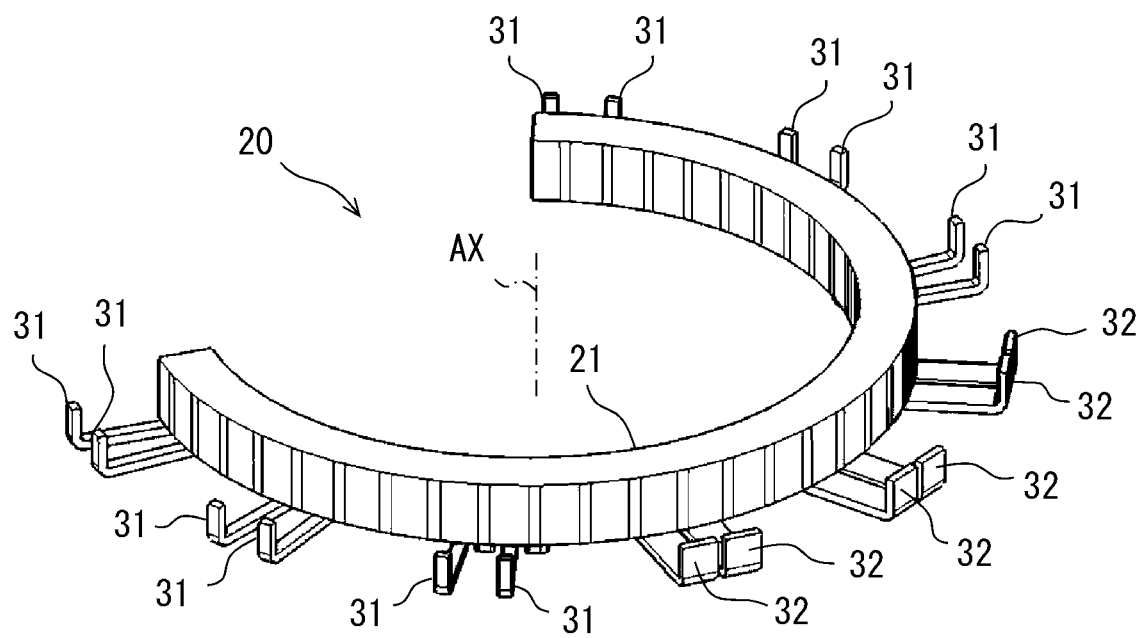
FIG. 4 is a perspective view of a bus bar unit.

FIG. 4 shows the bus bar unit 20. The illustrated bus bar unit 20 includes a holder 21 and a plurality of bus bars 30 housed in the holder 21. The illustrated bus bar unit 20 does not include the neutral point bus bar 41*a* (41*b*). The illustrated bus bar unit 20 provides so-called crossover wires that connect the plurality of coils to the power terminal.

Figure 5:
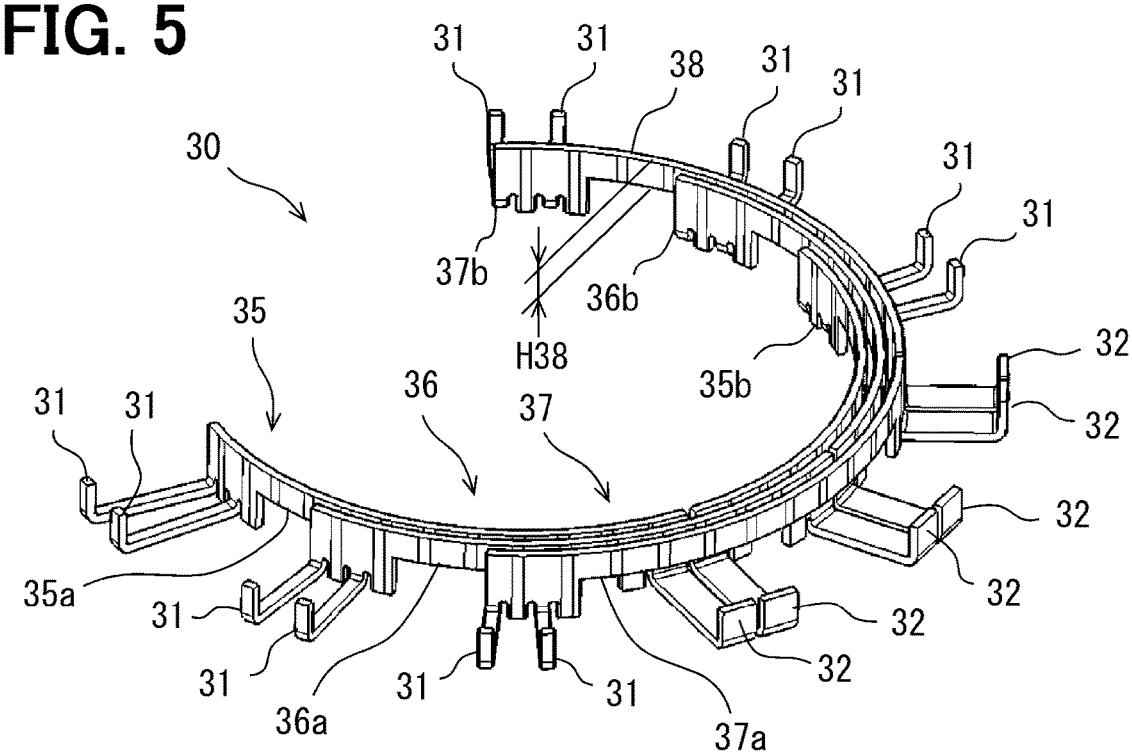
FIG. 5 is a perspective view of a plurality of bus bars.

FIG. 5 shows a plurality of bus bars 30. The plurality of bus bars 30 have three bus bars 35, 36, and 37. The three bus bars 35, 36, and 37 each provide a U-phase bus bar 30*u*, a V-phase bus bar 30*v*, and a W-phase bus bar 30*w*. The three bus bars 35, 36, and 37 are electrically isolated from each other. The three bus bars 35, 36, and 37 are arranged in multiple layers with respect to the radial direction. The bus bar 35 is arranged in a radial direction most inside. The bus bar 35 is also called an inner layer bus bar 35. The bus bar 37 is arranged in a radial direction most outside. The bus bar 37 is also called an outer layer bus bar 37. The bus bar 36 is arranged between the inner layer bus bar 35 and the outer layer bus bar 37. The bus bar 36 is also called a middle layer bus bar 36.

Each of the plurality of bus bars 30 has a main member 38 extending along the circumferential direction. The main member 38 has an arc shape. The main member 38 may be a polyhedron. The main member 38 has a height H38 with respect to the axial direction. The main member 38 extends in a ribbon shape along the circumferential direction.

The bus bar 35 has two partial bus bars 35*a* and 35*b* that are independent with respect to the circumferential direction. The partial bus bar 35*a* has an arc shape of 90 degrees or less. The partial bus bar 35*a* has two dispersive terminal members 31. The partial bus bar 35*a* has one collective terminal member 32. The partial bus bar 35*b* has an arc shape of 90 degrees or less. The partial bus bar 35*b* has two dispersive terminal members 31. The partial bus bar 35*b* has one collective terminal member 32. Both the partial bus bar 35*a* and the partial bus bar 35*b* are arranged in the inner layer. The partial bus bar 35*a* and the partial bus bar 35*b* provide a bus bar 35 that occupies an angle range of 90 degrees or more.

The bus bar 36 has two partial bus bars 36*a* and 36*b* that are independent with respect to the circumferential direction. The partial bus bar 36*a* has an arc shape of 120 degrees or less. The partial bus bar 36*a* has two dispersive terminal members 31. The partial bus bar 36*b* has one collective terminal member 32. The partial bus bar 36*b* has an arc shape of 120 degrees or less. The partial bus bar 36*a* has two dispersive terminal members 31. The partial bus bar 36*b* has one collective terminal member 32. Both the partial bus bar 36*a* and the partial bus bar 36*b* are arranged in the middle layer. The partial bus bar 36*a* and the partial bus bar 36*b* are arranged continuously in the circumferential direction to provide the bus bar 36 that occupies an angle range of 120 degrees or more.

The bus bar 37 has two partial bus bars 37*a* and 37*b* which are independent with respect to the circumferential direction. The partial bus bar 37*a* has an arc shape of 90 degrees or less. The partial bus bar 37*a* has two dispersive terminal members 31. The partial bus bar 37*a* has one collective terminal member 32. The partial bus bar 37*b* has an arc shape of 90 degrees or less. The partial bus bar 37*b* has two dispersive terminal members 31. The partial bus bar 37*b* has one collective terminal member 32. Both the partial bus bar 37*a* and the partial bus bar 37*b* are arranged in the outer layer. The partial bus bar 37*a* and the partial bus bar 37*b* provide a bus bar 37 that occupies an angle range of 90 degrees or more.

In this embodiment, the plurality of partial bus bars provide one bus bar. As a result, the size of the partial bus bar can be reduced. The plurality of partial bus bars facilitate the manufacturing process. Further, one bus bar includes a plurality of collective terminal members 32. As a result, it is possible to avoid current concentration.

Figure 6:
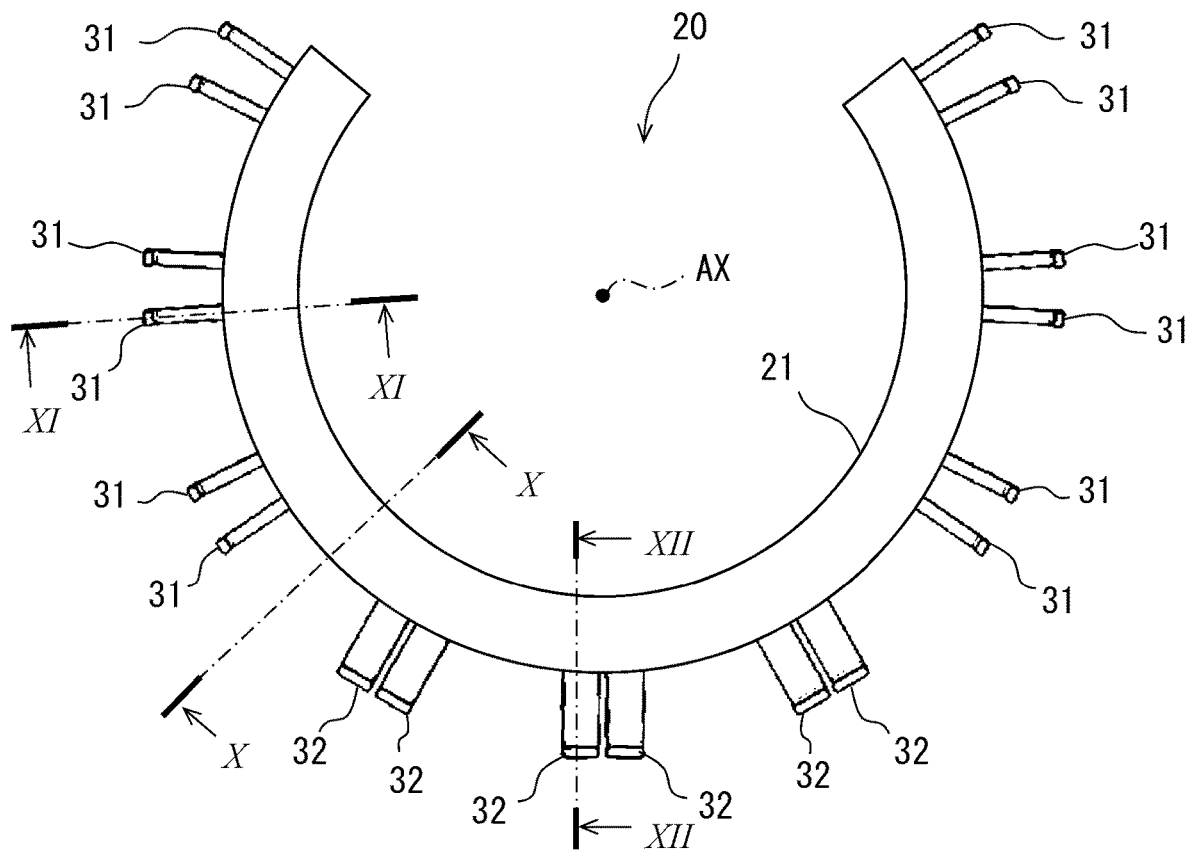
FIG. 6 is a plan view of the bus bar unit.

FIG. 6 shows the bus bar unit 20. FIG. 6 shows a plane view viewed from the arrow VI of FIG. 3. All terminal members 31 and 32 extend towards in the radial direction outside of the holder 21.

Figure 7:
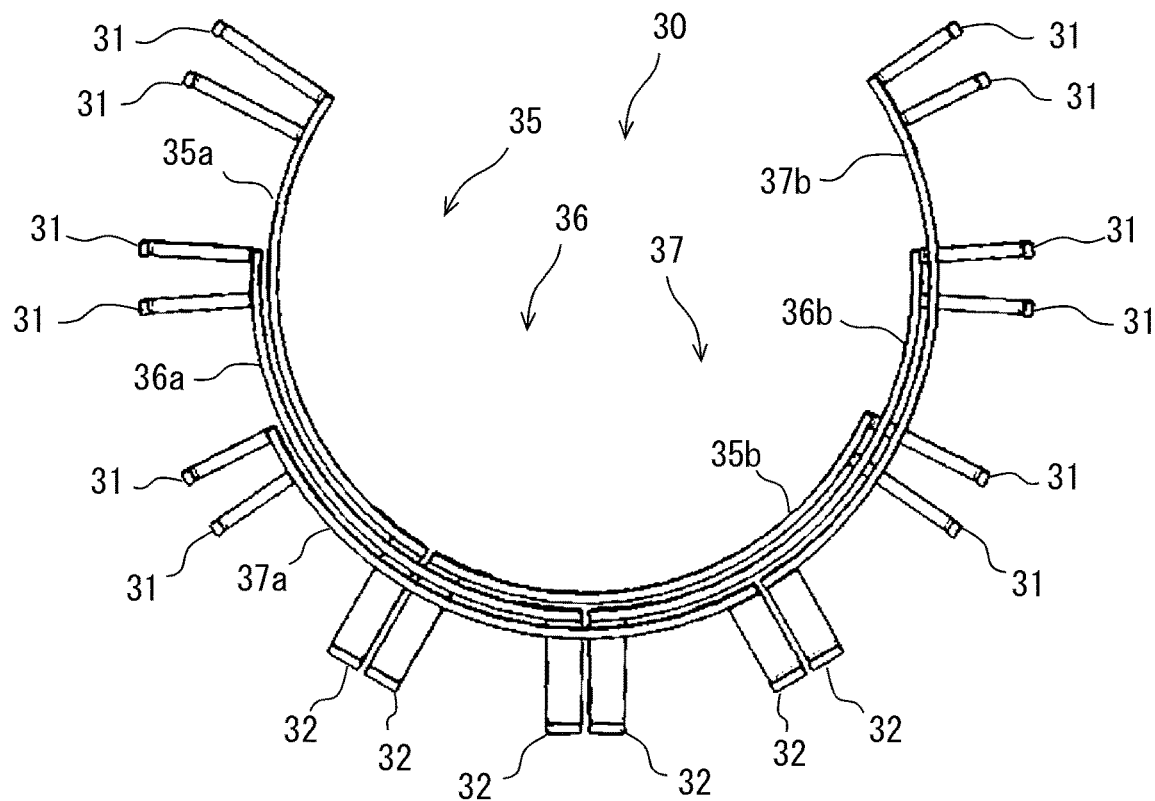
FIG. 7 is a plan view of the plurality of bus bars.

FIG. 7 shows the plurality of bus bars 30. The plurality of collective terminal members 32 are centrally arranged. The centralized arrangement of the plurality of collective terminal members 32 enables efficient connection work with the plurality of power terminal members 9. On the other hand, the plurality of dispersive terminal members 31 are arranged in a dispersive manner along the coil end 14. The dispersive arrangement of the plurality of dispersive terminal members 31 suppresses confusions of the coil terminals 16 at the coil end 14. Distances between the plurality of dispersive terminal members 31 are associated with the pitch of the plurality of slots or multiples of the pitch.

Figure 8:
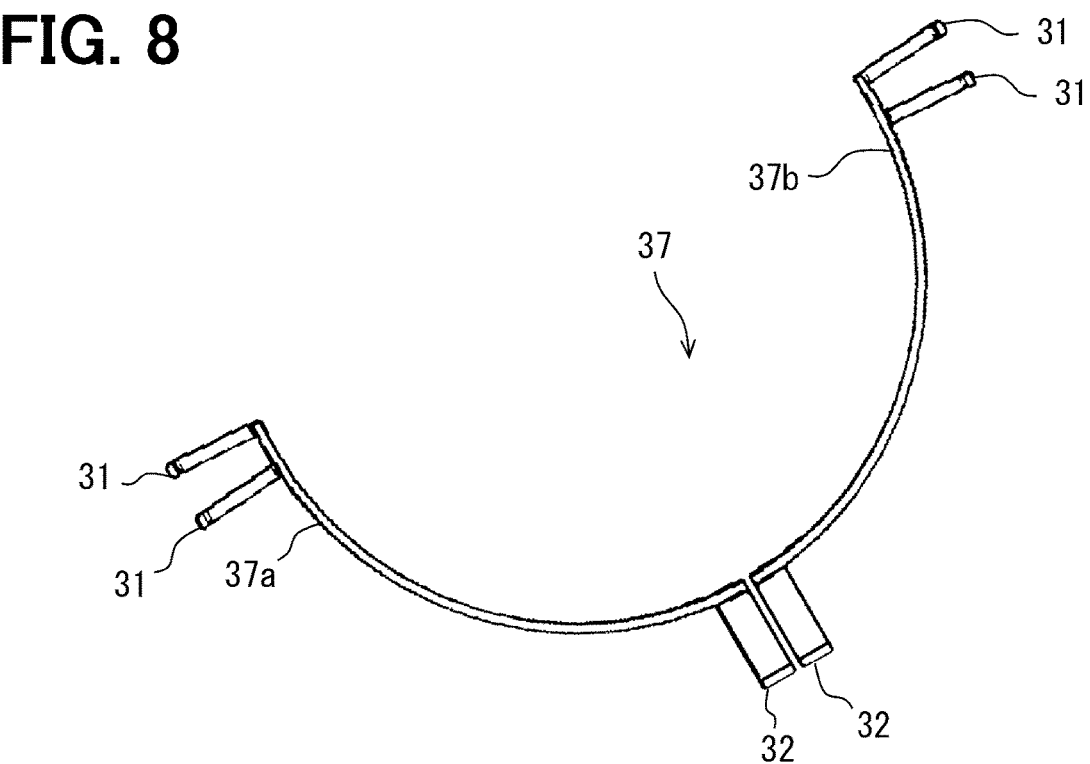
FIG. 8 is a plan view of one bus bar.

FIG. 8 shows one bus bar 37. One bus bar is divided into two pieces at a center position where the collective terminal members 32 and 32 should be disposed. The two partial bus bars 37*a* and 37*b* have a symmetrical shape.

Figure 9:
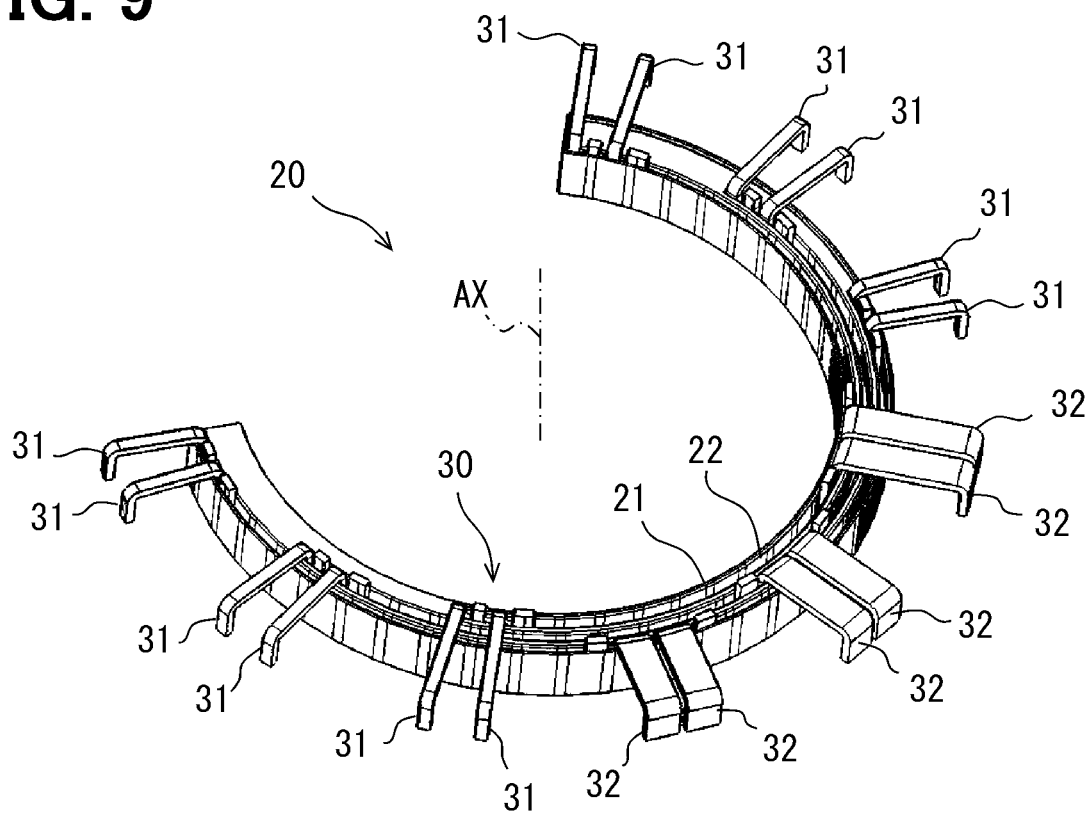
FIG. 9 is a perspective view of the bus bar unit.

FIG. 9 shows a back surface of the bus bar unit 20. The holder 21 has an opening 22. The holder 21 can also be called an arc-shaped container around the axis AX. The opening 22 is open towards the axial direction. The opening 22 is wide open to be able to receive the plurality of bus bars 30 along the axial direction. The plurality of bus bars 35, 36, and 37 partially overlap each other with respect to the radial direction. Moreover, the plurality of bus bars 35, 36, and 37 are arranged so as to be offset from each other with respect to the circumferential direction. Therefore, the angle range in which the holder 21 extends in the circumferential direction is wider than the angle range of any one of the plurality of bus bars 35, 36, and 37. Further, the holder 21 has a non-arrangement angle range in which no bus bar is accommodated at both ends as an arc shape. The non-arrangement angle range is formed on the inside at one end of the arc. The non-arrangement angle range is formed on the outside at the other one end of the arc. The plurality of terminal members 31 and 32 extend in the radial direction outside from each of the inner layer, the middle layer, and the outer layer. The plurality of terminal members 31 and 32 are arranged radially with respect to the axis AX.

Returning to FIG. 3, the holder 21 is a container made of an insulating member and houses the bus bar 30. The holder 21 is arranged in the axial direction of the stator core 11. The opening 22 is open toward the stator core 11. The opening 22 faces the stator core 11. The bus bar unit 20 is positioned so that the opening 22 faces the one end surface 11*a* of the stator core 11. The bus bar unit 20 is positioned in the axial direction outside of the coil end 14. As a result, the bus bar unit 20 is positioned so that the opening 22 faces the coil end 14. The bus bar unit 20 is positioned on the axial direction outside of the coil end 14 so that the holder 21 is turned down.

Figure 10:
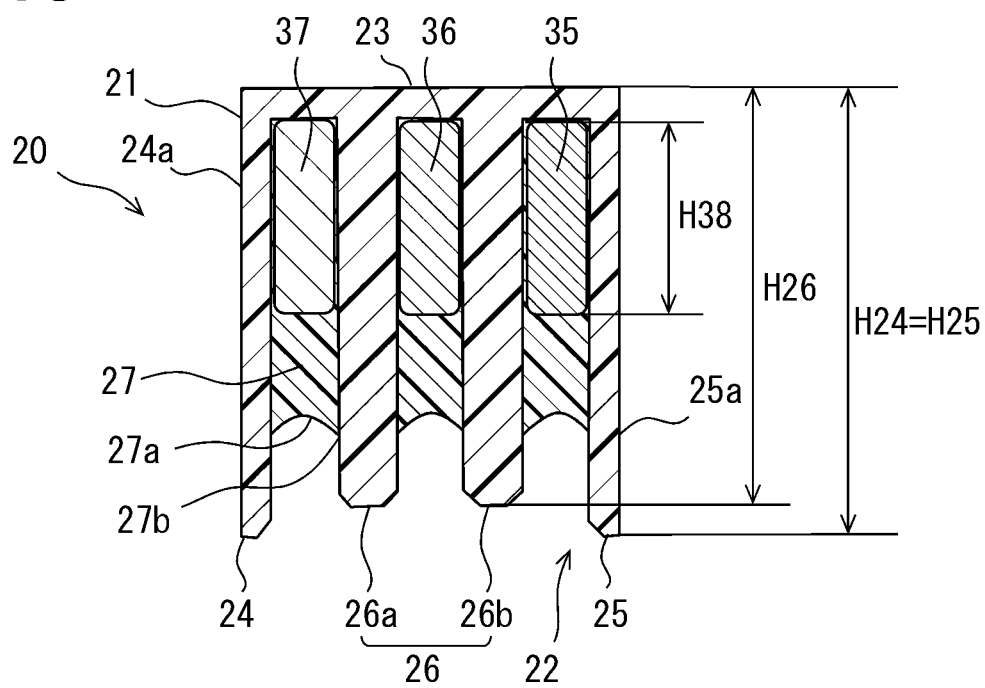
FIG. 10 is a cross-sectional view on a line X-X of FIG. 6.

FIG. 10 shows an end face of a cut surface portion in an X-X line of FIG. 6. The holder 21 has a plurality of partition walls 26 for defining an inner layer, a middle layer, and an outer layer in the inside. The holder 21 has an opening 22. The holder 21 has a bottom wall 23, an outer wall 24 in the radial direction outside, and an inner wall 25 in the radial direction inside. The outer wall 24 provides an outer surface 24*a* in the radial direction outside. The inner wall 25 provides an inner surface 25*a* in the radial direction inside. Further, the holder 21 has one or more partition walls 26. The partition wall 26 divides the inside of the holder 21 into a plurality of layers, i.e., grooves with respect to the radial direction. The illustrated embodiment has two partition walls 26*a* and 26*b*. The outer wall 24 and the inner wall 25 have heights H24 and H25. The height H24 and the height H25 are equal (H24=H25). The partition walls 26*a* and 26*b* have a height H26. The height H26 is lower than the height H24 or the height H25 (H26<H24, H26<H25). Thicknesses of the partition walls 26*a* and 26*b* in the radial direction are thicker than thicknesses of the outer wall 24 and the inner wall 25 in the radial direction. This difference in thickness satisfies the electrical insulation performance. The partition wall 26 is a wall that is continuous along the circumferential direction. However, the partition wall 26 may be provided by a plurality of walls intermittently provided along the circumferential direction. Further, the partition wall 26 may have one or more openings that penetrate in the radial direction. The partition wall 26 may be also called a rib.

The outer wall 24, the inner wall 25, and the plurality of partition walls 26*a* and 26*b* form a plurality of slit-shaped bus bar chambers. The illustrated embodiment forms three bus bar chambers. Each of the bus bars 35, 36, and 37 is inserted in each bus bar chamber. Also in this embodiment, the plurality of partition walls 26*a* and 26*b* provide a long creep distance among the plurality of bus bars 35, 36, and 37 arranged in a multiple layered manner in the radial direction. Therefore, the plurality of partition walls 26*a* and 26*b* suppress creep discharge.

The bus bars 35, 36, and 37 may be press-fitted into the bus bar chamber. Further, a gap may be positively formed between the holder 21 and the bus bars 35, 36, and 37. Further, contact portions and gaps may be alternately formed between the holder 21 and the bus bars 35, 36, and 37. The gap allows the presence of a resin member described later.

The holder 21 has an insulating resin member 27 applied to the opening 22. The resin member 27 is applied from the opening 22. The resin member 27 is applied to the inside of the holder 21. The resin member 27 adheres the inner surface of the holder 21 to the surfaces of the bus bars 35, 36, and 37. The resin member 27 is filled in the inside of the holder 21. The resin member 27 covers the main member 38 of the bus bars 35, 36, and 37.

The resin member 27 is a potting resin. The resin member 27 is dropped from the opening 22 and cured in the holder 21. The surface 27*a* of the resin member 27 is in contact with the side surfaces of the plurality of walls 24, 25, and 26 at a boundary line 27*b*. The surface 27*a* is curved in a concave shape. A height of the resin member 27 is lower than the heights of the plurality of walls 24, 25, and 26. The resin member 27 has a surface 27*a* lower than apexes of the plurality of walls 24, 25, and 26.

Focusing on the bus bar 35, the holder 21 has the partition wall 26*b* positioned in the radial direction inside and the inner wall 25 positioned in the radial direction outside. The bus bar 35 is housed in a groove surrounded by the bottom wall 23, the partition wall 26*b*, and the inner wall 25. The resin member 27 covers the bus bar 35.

Focusing on the bus bar 36, the holder 21 has the partition wall 26*a* positioned in the radial direction inside and the partition wall 26*b* positioned in the radial direction outside. The bus bar 36 is housed in a groove surrounded by the bottom wall 23, the partition wall 26*a*, and the partition wall 26*b*. The resin member 27 covers the bus bar 36.

Focusing on the bus bar 37, the holder 21 has the partition wall 26*a* positioned in the radial direction inside and the outer wall 24 positioned in the radial direction outside. The bus bar 37 is housed in a groove surrounded by the bottom wall 23, the outer wall 24 and the partition wall 26*a*. The resin member 27 covers the bus bar 37.

Further, the holder 21 has an inner wall 25 positioned in the radial direction most inside and an outer wall 24 positioned in the radial direction most outside. The resin member 27 has a surface 27*a* lower than apexes of the inner wall 25 and the outer wall 24. As a result, the resin member 27 is separately arranged in each of the plurality of grooves provided by the holder 21.

The holder 21 is made of resin. The holder is a resin molded product molded by injection molding. The resin member 27 is made of a soft resin that is softer than the resin forming the holder 21. The resin member 27 is also an adhesive resin member that adheres the bus bar 30 and the holder 21. The resin member 27 embeds the bus bar 30 in the inside the opening 22 of the holder 21. The resin member 27 is a thermosetting resin.

Returning to FIG. 3, the resin member 27 faces one end surface 11a of the stator core 11. The resin member 27 faces the coil end 14.

Figure 11:
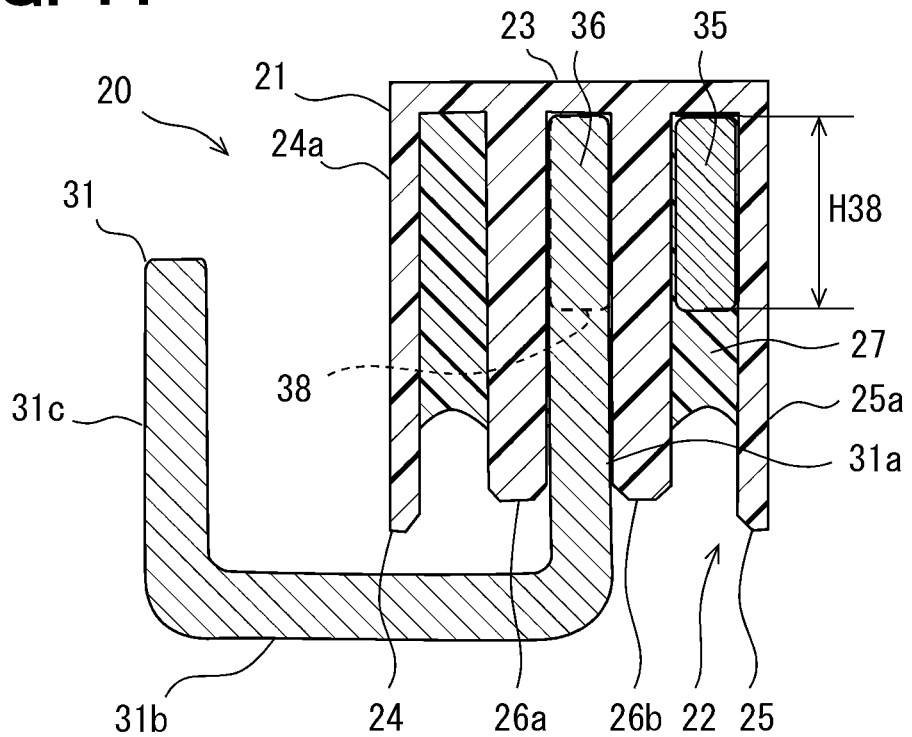
FIG. 11 is a cross-sectional view on a line XI-XI of FIG. 6.

FIG. 11 shows an end face of a cut surface portion in the X-X line of FIG. 6. A cut surface of one dispersive terminal member 31 is shown. The dispersive terminal member 31 has a first portion 31a. The first portion 31a extends from the main member 38 along the axial direction. The first portion 31a protrudes from the opening 22. The dispersive terminal member 31 has a second portion 31b. The second portion 31b extends in the radial direction outside from the end of the first portion 31a along the radial direction. The second portion 31b projects in the radial direction outside from the holder 21. The dispersive terminal member 31 has a third portion 31c. The third portion 31c extends from a distal end of the second portion 31b along the axial direction so as to overlap with the radial direction outside of the holder 21. The third portion 31c reaches a position overlapping with the holder 21 with respect to the radial direction. The third portion 31c faces the outer surface 24a of the holder 21. At the position of FIG. 11, the outer layer bus bar 37 does not exist. The plurality of bus bars 35, 36, and 37 partially overlap each other with respect to the radial direction. Moreover, the plurality of bus bars 35, 36, and 37 are arranged so as to be offset from each other with respect to the circumferential direction.

Figure 12:
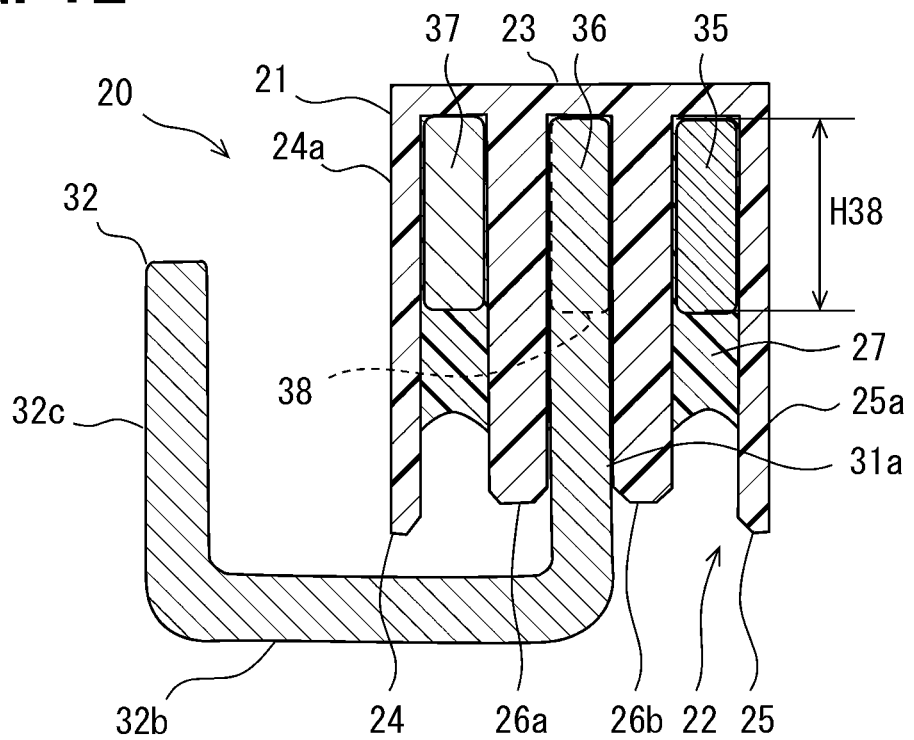
FIG. 12 is a cross-sectional view on a line XII-XII of FIG. 6.

FIG. 12 shows an end surface of a cut surface portion in a XII-XII of FIG. 6. A cut surface of one collective terminal member 32 is shown. The collective terminal member 32 has a first portion 32a. The first portion 32a extends from the main member 38 along the axial direction. The first portion 32a protrudes from the opening 22. The collective terminal member 32 has a second portion 32b. The second portion 32b extends towards the radial direction outside from the end of the first portion 32a along the radial direction. The second portion 32b projects in the radial direction outside from the holder 21. The collective terminal member 32 has a third portion 32c. The third portion 32c extends from a distal end of the second portion 32b along the axial direction so as to overlap the radial direction outside of the holder 21. The third portion 32c reaches a position overlapping with the holder 21 with respect to the radial direction. The third portion 32c faces the outer surface 24a of the holder 21.

FIG. 11 and FIG. 12 show the plurality of terminal members 31 and 32 included in one bus bar 36. The plurality of terminal members 31 and 32 extend from the opening 22 of the holder 21. These terminal members 31 and 32 extend from the surface of the resin member 27. The bus bar 30 has a main member 38 extending in the circumferential direction. The holder 21 has a groove deeper than the height H38 of the main member 38. The opening 22 is also the opening of the groove.

Figure 13:
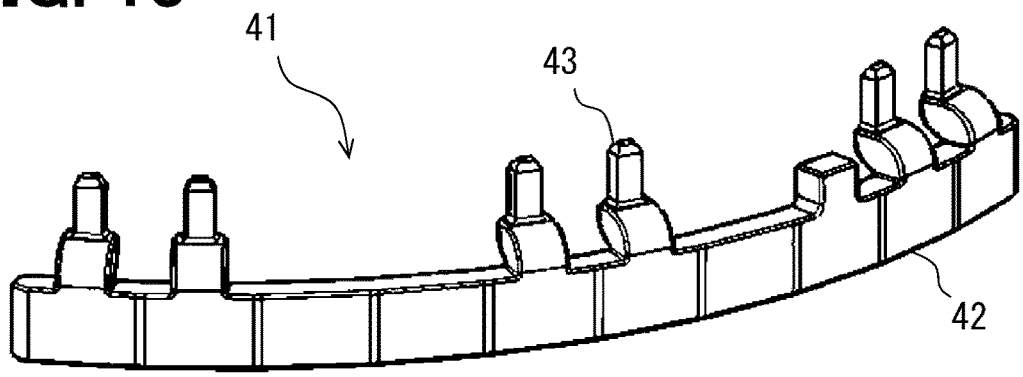
FIG. 13 is a perspective view of a neutral point bus bar.
Figure 14:
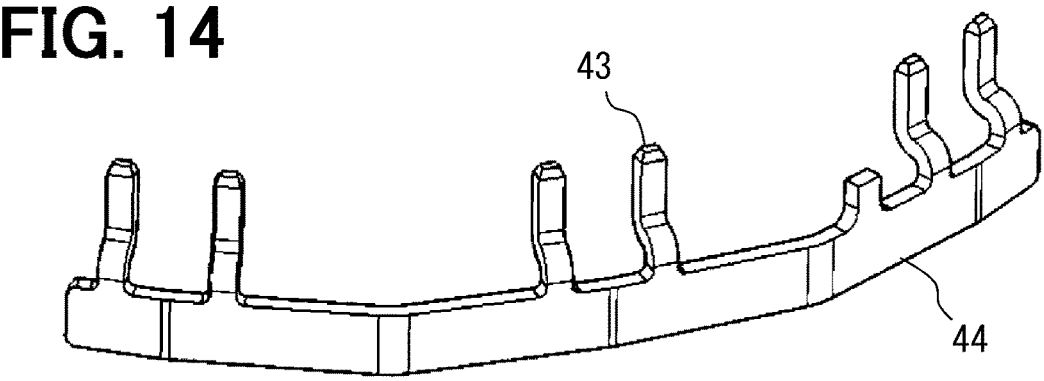
FIG. 14 is a perspective view of a neutral point bus bar.

FIG. 13 shows one of the neutral point bus bars 41. FIG. 14 shows the bus bar 44 of the neutral point bus bars 41. The neutral point bus bar 41 is intended to be mounted on the side surface of the coil end 14. The neutral point bus bar 41 has an arc shape. The neutral point bus bar 41 has a main body portion 42 covered with an insulating member. The main body portion 42 extends along the circumferential direction. The main body portion 42 accommodates a bus bar 44 made of a conductive material. The neutral point bus bar 41 has a plurality of terminal members 43 extending in the axial direction. In the illustrated example, the neutral point bus bar 41 has six terminal members 43. The terminal member 43 is joined to the coil terminal 16 for neutral point connection. In this embodiment, since the two neutral point bus bars 41 are used, a total of 12 terminal members are provided.

A manufacturing method of the rotary electric machine 1 is described. The method for manufacturing the rotary electric machine 1 includes a step of assembling the rotor 4, a step of assembling the stator 10, and a step of accommodating the rotor 4 and the stator 10 in the housing 6. The rotor assembling step and the stator assembling step may be in a reverse order. The assembling step of the stator 10 includes a step of manufacturing the stator core 11 that provides a plurality of slots, a step of mounting the stator coil 12 on the stator core 11, and a step of positioning the coil end 14 at an end of the stator core 11. The step of positioning the coil end 14 includes a step of arranging the plurality of coil terminals 16 at predetermined positions by pulling out the plurality of coil terminals 16 from the coil end 14.

The assembling step of the stator 10 includes a step of assembling the bus bar unit 20. The bus bar unit assembling step includes a step of molding the holder 21 by injection molding of an insulating resin. At this step, the holder 21 having the opening 22 is formed. A plurality of partition walls 26a and 26b are formed in the inside the holder 21 so as to form a plurality of grooves. The bus bar unit assembling step includes a step of mounting the bus bar 30 made of a conductive member from the opening 22 of the holder 21 made of an insulating member.

The bus bar unit assembling step includes a step of applying the insulating resin member 27 from the opening 22. This step is a step in which the resin member 27 is dropped from the opening 22 by potting and cured. At this step, the holder 21 is positioned with the opening 22 facing upward in a direction of gravity. The resin member 27 is dropped from above into the opening 22. The resin member 27 forms a concave surface 27a due to shrinkage during the curing or surface tension. The resin member 27 is applied so as to embed the plurality of bus bars 30.

The bus bar unit assembling steps may be performed independently. The bus bar unit assembling step may be performed before the other steps. The bus bar unit assembling step may include a step of coating an adhesive to the inside of the holder 21 and a step of mounting the bus bar 30 after that. In the bus bar unit assembling step, the resin member 27 may be applied after that.

The assembling step of the stator 10 includes a step of positioning the bus bar unit 20 so that the opening 22 faces the one end surface 11a in the axial direction of the stator core 11. At this time, the bus bar unit 20 is inverted from the posture at the step of applying the resin member 27. In a typical method of manufacturing a stator, the stator 10 is positioned so that the coil end 14 is on top, and the bus bar unit 20 is placed on the coil end 14. At this time, the bus bar unit 20 is positioned so that the opening 22 faces downward. This step is also a step in which the resin member 27 is positioned so as to face one end surface 11a of the stator core 11. From another point of view, this step is also a step of positioning the bus bar unit 20 so that the opening 22 faces the coil end 14. Further, in other words, this step is also a step in which the bus bar unit 20 is positioned so that the resin member 27 faces the coil end 14. As a result, the bottom wall 23 of the holder 21 is positioned in the axial direction outside of the stator 10.

The assembling step of the stator 10 includes a step of electrically connecting the plurality of coil terminals 16 included in the coil end 14 and the plurality of terminal members 31 and 32. The plurality of terminal members 31 and 32 and the plurality of coil terminals 16 are positioned in the radial direction outside of the holder 21. Further, one of the terminal members 31 and 32 and one of the coil terminals 16 to be electrically joined are positioned at the same angular position in the circumferential direction. Therefore, a plurality of joining operations can be easily performed. At this time, the bus bar unit 20 is positioned so as to be separated from the coil end 14, and in that state, the plurality of coil terminals 16 and the plurality of terminal members 31 and 32 are joined. As a result, the bus bar unit 20 is supported by the plurality of coil terminals 16 and the plurality of terminal members 31 and 32. Further, this step includes joining the coil terminals 16 for the neutral point and the neutral point bus bars 41a and 41b.

The step of accommodating the rotor 4 and the stator 10 in the housing 6 includes a step of positioning the housing 8 on the radial direction outer side and/or the axial direction outer side of the bottom wall 23 of the holder 21.

According to the embodiment described above, a rotary electric machine having improved insulation performance, a stator thereof, and a method for manufacturing the rotary electric machine are provided. Since the opening 22 faces one end surface 11a, the exposure of the bus bar 30 housed in the holder 21 is suppressed. Therefore, lowering of the insulation performance in the assembling step or the maintenance step is suppressed.

Further, the holder 21 is positioned in the outside by the resin member 27 facing the one end surface 11a. As a result, the resin member 27 is protected at the assembling step or the maintenance step. Since the holder 21 having relatively few defects in the insulating member faces the outside, the insulating performance is improved. On the other hand, since the resin member 27, which is relatively prone to defects, is positioned to face the stator core 11, deterioration of insulation performance due to defects is suppressed. Defects include, for example, air bubbles, pinholes, foreign matter and the like. When the resin member 27 is a potting resin or a soft resin, the protective effect is remarkable. As a result, deterioration of insulation performance is suppressed.

According to this embodiment, the bus bar 30 can be protected from cooling medium, i.e., fluid for the stator 10. The cooling medium reaches the surface of the opening 22 or the resin member 27. At the same time, the cooling medium brings foreign matter. In this embodiment, the holder 21 is arranged so that the opening 22 or the resin member 27 faces one end surface 11a. Therefore, a strong flow of the cooling medium does not reach the opening 22. Further, direct arrival and arrival of foreign matter to the opening 22 are suppressed. As a result, deterioration of insulation performance is suppressed. In particular, when a liquid such as water or oil is used as the cooling medium, the effect of suppressing the arrival of foreign matter and the effect of protecting the resin member 27 are remarkable.

Second Embodiment

This embodiment is a modification based on the preceding embodiment. In the above embodiment, four phase coils are connected as one phase. Alternatively, one phase may include one or more phase coils. For example, two, three, five, six and the like are possible. In this embodiment, two phase coils are connected.

Figure 15:
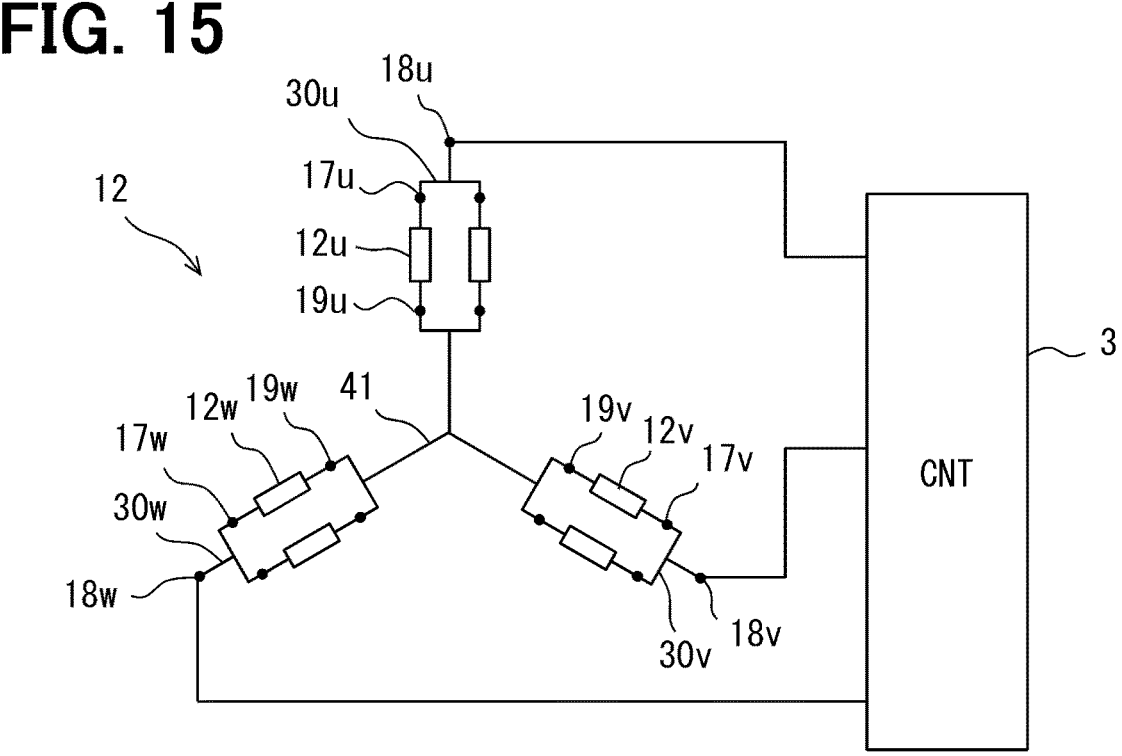
FIG. 15 is a circuit diagram of a stator coil of a second embodiment.
Figure 16:
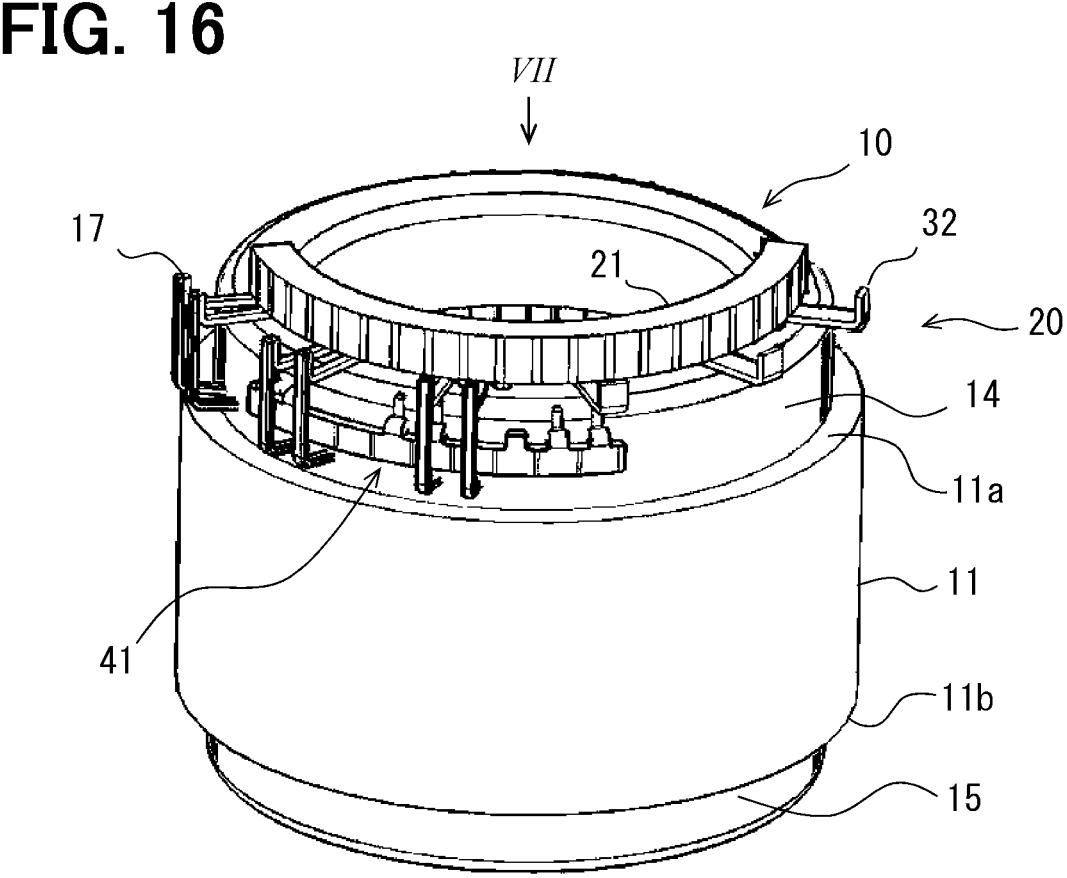
FIG. 16 is a perspective view of a stator.
Figure 17:
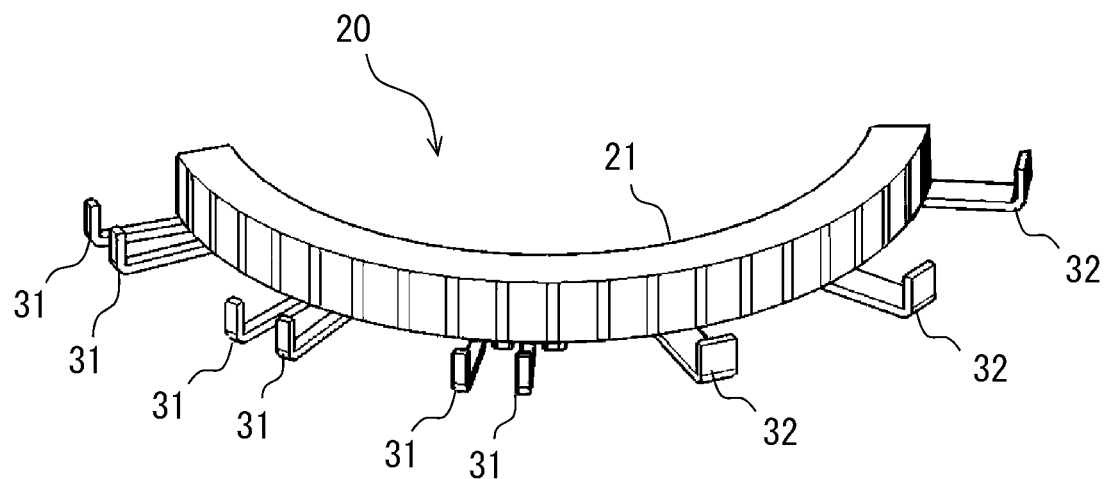
FIG. 17 is a perspective view of a bus bar unit.
Figure 18:
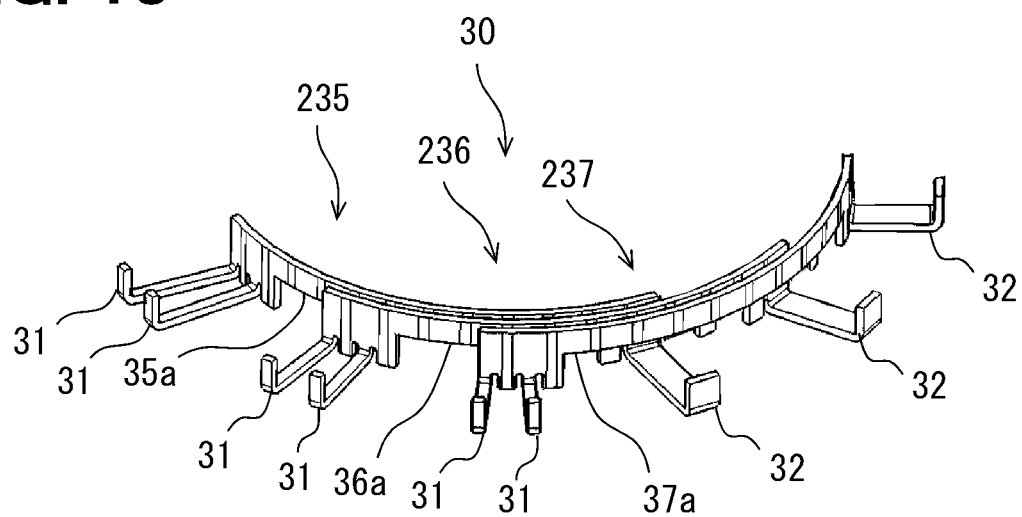
FIG. 18 is a perspective view of a plurality of bus bars.
Figure 19:
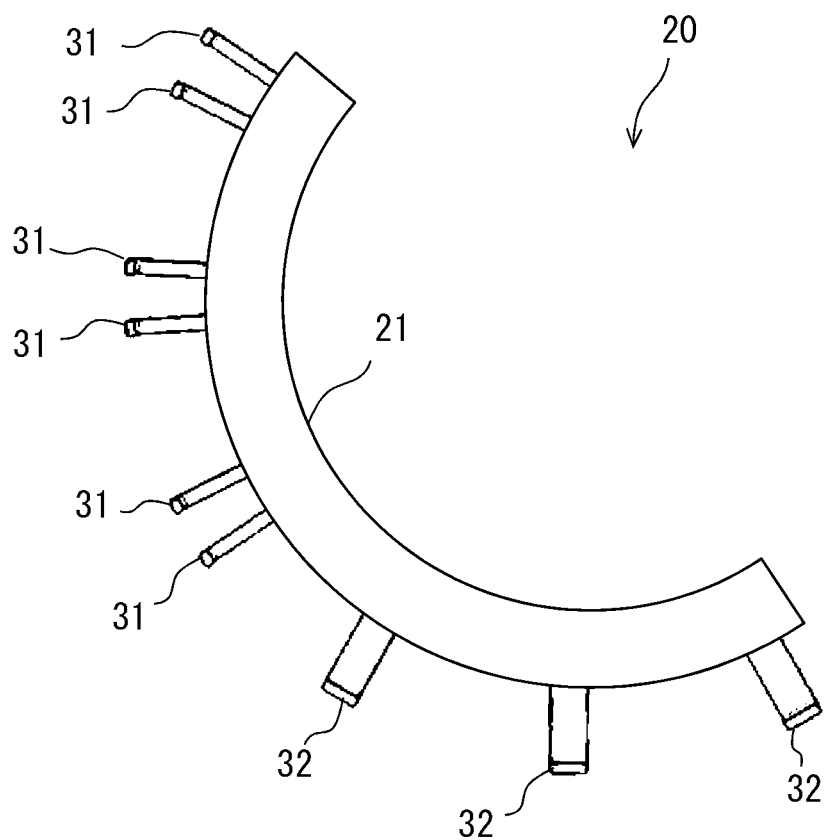
FIG. 19 is a plan view of the bus bar unit.
Figure 20:
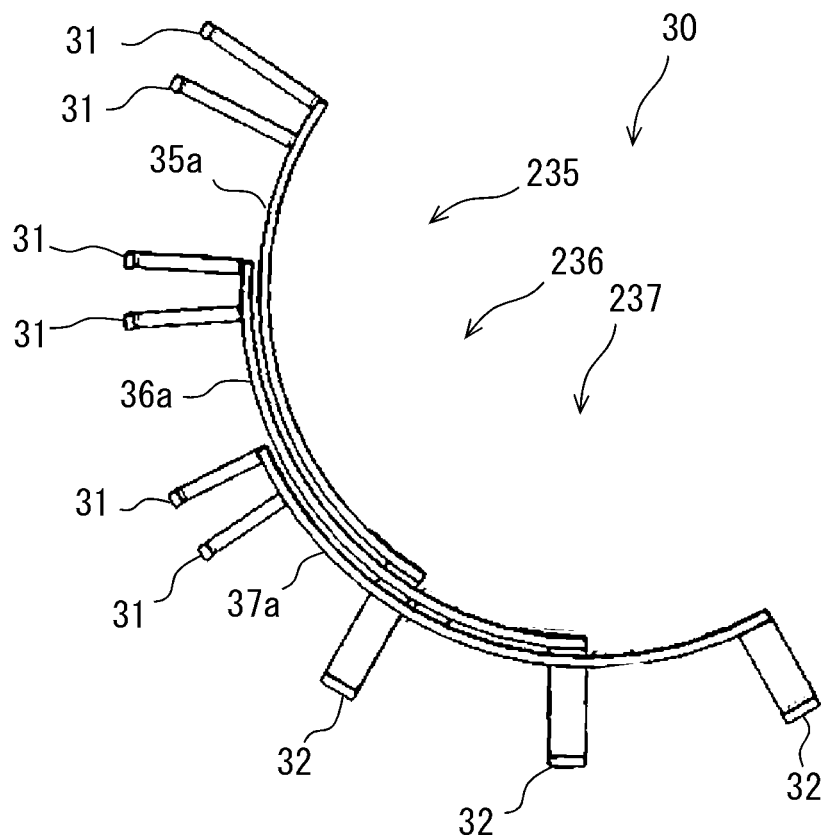
FIG. 20 is a plan view of the plurality of bus bars.
Figure 21:
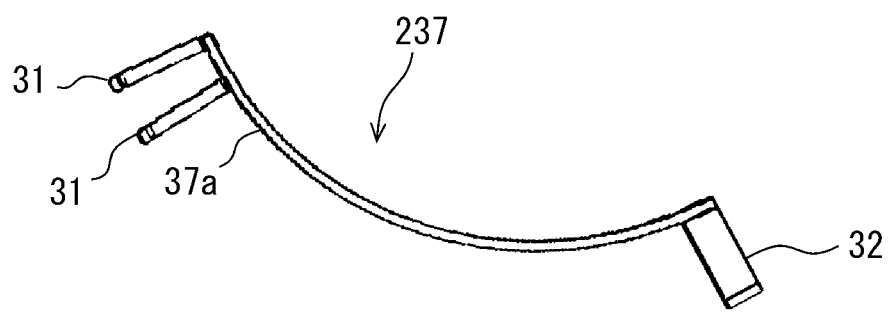
FIG. 21 is a plan view of one bus bar.

In FIG. 15, one phase is provided by a parallel connection of two phase coils. FIG. 16 shows the stator 10. FIG. 17 shows the bus bar unit 20. FIG. 18 shows a plurality of bus bars 30. FIG. 19 shows the bus bar unit 20. FIG. 20 shows a plurality of bus bars 30. FIG. 21 shows one bus bar. In this embodiment, a bus bar unit 20 which is half of the above embodiment is used. There is only one neutral point bus bar 41. In this embodiment, the plurality of bus bars 235, 236, and 237 are provided by the partial bus bars 35a, 36a, and 37a of the above embodiment.

Third Embodiment

This embodiment is a modification based on the preceding embodiment. In the above embodiment, the resin member 27 is separately arranged in each of the plurality of grooves. Alternatively, the resin member 27 may be continuously arranged across the plurality of grooves.

Figure 22:
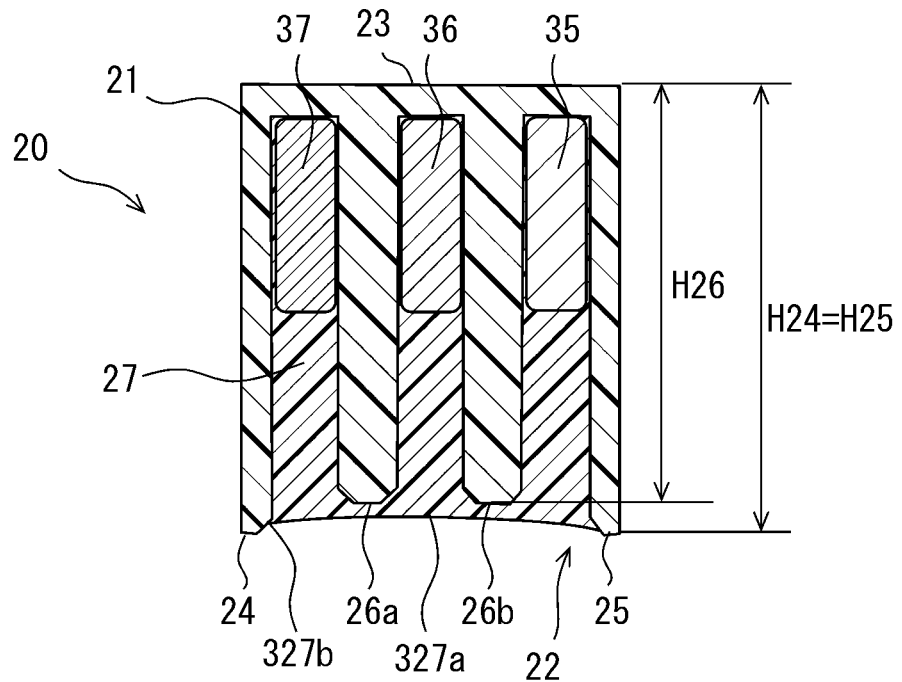
FIG. 22 is a cross-sectional view of a bus bar unit of a third embodiment.

FIG. 22 shows an end face of the bus bar unit 20. The resin member 27 is continuously arranged over a plurality of grooves. The surface 327a extends beyond the partition walls 26a and 26b and is continuous over adjacent grooves. In this embodiment, a boundary line 327b is positioned on the side surface of the outer wall 24 and the side surface of the inner wall 25.

Fourth Embodiment

This embodiment is a modification based on the preceding embodiment. In the above embodiment, the resin member 27 is only a potting resin. Alternatively, the resin member 27 may contain a plurality of resin materials.

Figure 23:
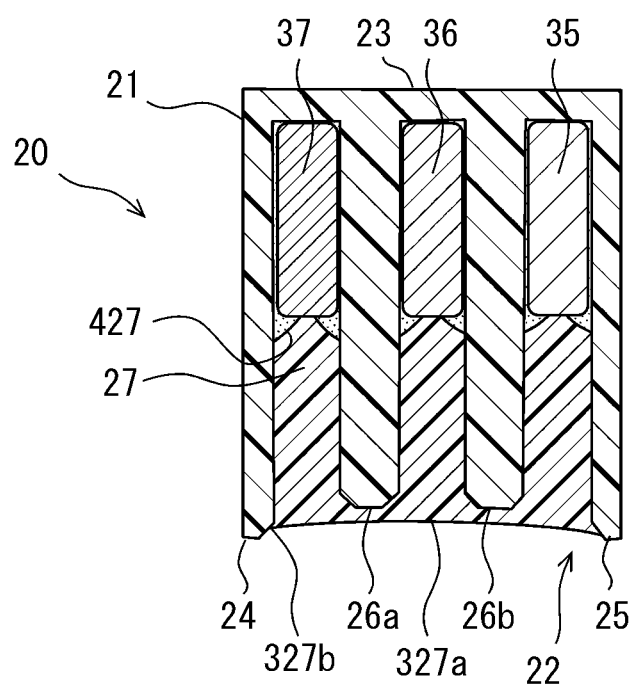
FIG. 23 is a cross-sectional view of a bus bar unit of a fourth embodiment.

FIG. 23 shows an end face of the bus bar unit 20. The assembling step of the bus bar unit 20 includes a step of applying the adhesive 427 to the inner surface of the holder 21 before mounting the bus bar 30. The assembling step of the bus bar unit 20 includes a step of arranging the bus bar 30 in the holder 21, a step of adhering the bus bar 30 with the adhesive 427, and a step of applying the resin member 27 thereafter. A portion of the adhesive 427 is extruded between the holder 21 and the bus bar 30. The adhesive 427 provides an adhesive resin member. Therefore, the bus bar 30 is covered with both the adhesive 427 and the resin member 27.

Fifth Embodiment

This embodiment is a modification based on the preceding embodiment. In the above embodiment, the bus bar unit 20 accommodates a plurality of bus bars 35, 36, 37 for crossover wires. Alternatively, the bus bar unit 20 may accommodate the neutral point bus bar 41.

Figure 24:
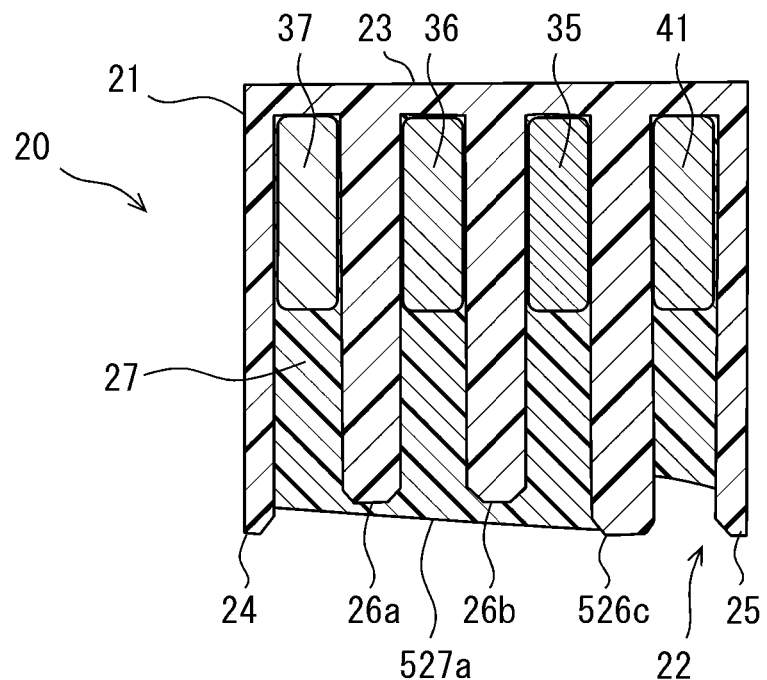
FIG. 24 is a cross-sectional view of a bus bar unit of a fifth embodiment.

FIG. 24 shows the bus bar unit 20. The holder 21 has a partition wall 526c in addition to the above embodiment. A groove for accommodating the neutral point bus bar 41 is defined between the partition wall 526c and the inner wall 25. The neutral point bus bar 41 is housed between the partition wall 526c and the inner wall 25.

Further, in the above embodiment, the resin member 27 provides a concave surface 27a. Alternatively, the resin member 27 may have a variety of surfaces.

In FIG. 24, the resin member 27 has a surface 527a inclined with respect to the bottom wall 23. The inclination of the surface 527a depends on a posture of the holder 21 at a time of curing. The surface 527a is linear.

Sixth Embodiment

This embodiment is a modification based on the preceding embodiment. In the above embodiment, the bus bar unit 20 has a resin member 27. Alternatively, the bus bar unit 20 may not include the resin member 27.

Figure 25:
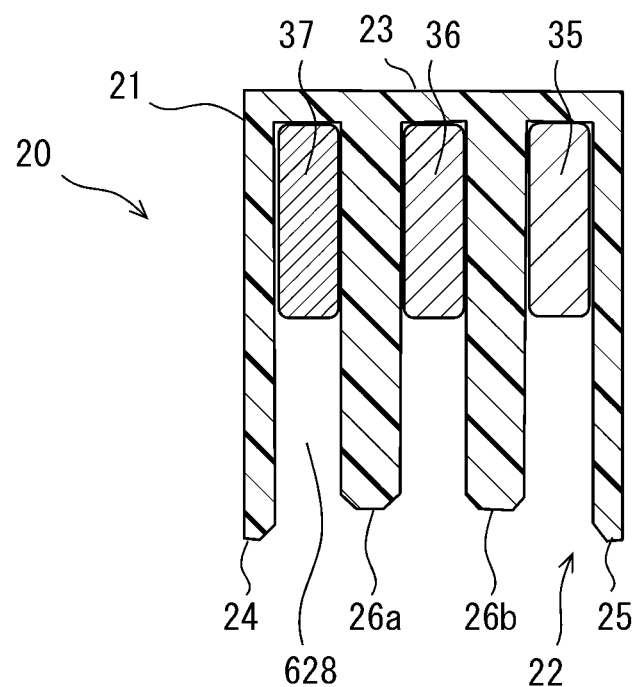
FIG. 25 is a cross-sectional view of a bus bar unit of a sixth embodiment.

FIG. 25 shows an end face of the bus bar unit 20. The bus bar unit 20 accommodates a plurality of bus bars 35, 36, and 37 in a plurality of grooves. The bus bar unit 20 has a cavity 628. Also in this embodiment, the plurality of partition walls 26a and 26b provide a long creep distance among the plurality of bus bars 35, 36, and 37 arranged in multiple layers in the radial direction. Therefore, the plurality of partition walls 26a and 26b suppress creep discharge.

Seventh Embodiment

This embodiment is a modification based on the preceding embodiment. In the above embodiment, two neutral point bus bars 41a and 41b are used. Alternatively, one neutral point bus bar may be used.

Figure 26:
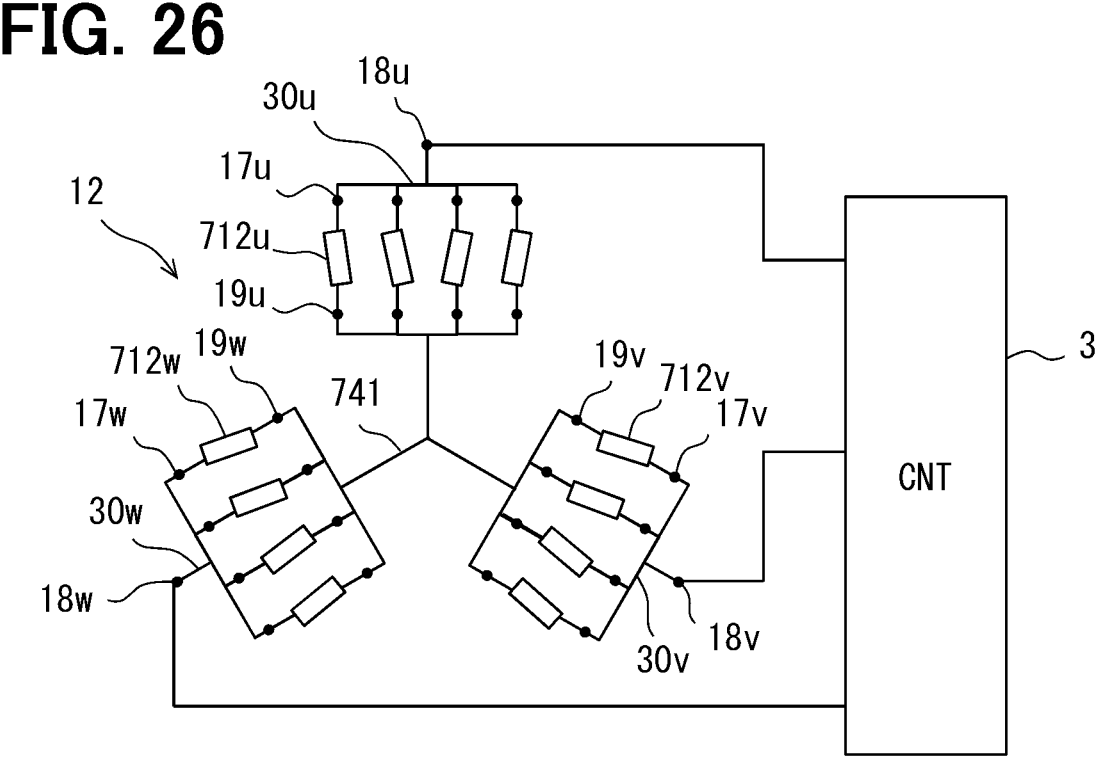
FIG. 26 is a circuit diagram of a stator coil of a seventh embodiment.

In FIG. 26, the stator coil 12 has one neutral point bus bar 741. The neutral point bus bar 741 connects 12 phase coils.

Further, the plurality of phase coils forming one phase may be dispersed in one phase. The four phase coils 712u, 712v, and 712w include two groups of phase coils having different electric angles. The two groups of phase coils have dispersed electrical angles in a range of several degrees to several tens of degrees.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

In the above embodiments, the rotary electric machine 1 provides an electric motor. Alternatively, the rotary electric machine 1 may provide an electric motor. In this case, the stator coil 12 is also called a field winding. Alternatively, the rotary electric machine 1 may provide a generator. In this case, the stator coil 12 is also called an armature winding.

In the above embodiment, the stator coil 12 has coil ends 14 and 15 at both ends of the stator core 11. The coil end 14 is arranged so as to face the opening 22. The coil end 14 can be provided in various forms. In one form, the stator coil 12 may be formed by winding a plurality of continuous conductors. In this case, the coil end 14 is provided by a group of bend portions of continuous wires. In one other form, the stator coil 12 may be provided by a plurality of segment conductors. In this case, the coil end 14 is provided by turn portions of the segment conductors or joint portions joining a plurality of segment conductors. The segment conductor is U-shaped or I-shaped. The shape of such a coil end is disclosed in, for example, Patent Literature 2: JP2000-166150A. JP2000-166150A is incorporated by reference in its entirety in this application. The plurality of segment conductors may be connected by a plurality of connecting conductors arranged at the coil end 14. The shape of such a coil end is disclosed in, for example, Patent Literature 3: JP2018-125924A. JP2018-125924A is incorporated by reference in its entirety in this application.

In the above embodiment, the holder 21 is made of resin. Alternatively, the holder 21 may be made of an insulating member such as ceramic.

In the above embodiment, the holder 21 is arranged outer side than the coil end 14 in the axial direction. Alternatively or additionally, the holder 21 may be arranged outer side than the coil end 14 in the radial direction. In the above embodiment, the holder 21 faces the corner on the radial direction outside of the coil end 14. Alternatively, the holder 21 may be arranged only in the axial direction of the coil end 14.

In the above embodiment, one phase is provided by a plurality of phase coils connected in parallel. Alternatively, a series connection may be included in one phase. For example, one phase may be provided by connecting two phase coils connected in parallel and two phase coils connected in parallel in series.

In the above embodiment, the plurality of terminal members 31 and 32 in the bus bar unit 20 have a shape that can be called a J-shape or a U-shape. Alternatively, the plurality of terminal members 31 and 32 can be provided in various shapes such as an I-shape and an L-shape. For example, the plurality of terminal members 31 and 32 may be provided by only the first portions 31a and 32a in FIG. 11 and FIG. 12. Further, the plurality of terminal members 31 and 32 may be provided by the first portions 31a and 32a and the second portions 31b and 32b in FIG. 11 and FIG. 12.

In the above embodiment, the bus bar unit 20 is supported by a plurality of coil terminals 16. Alternatively, the bus bar unit 20 may be connected to the stator core 11 or the coil end 14. The holder 21 may have, for example, a plurality of legs for contacting the stator core 11 or the coil end 14. The plurality of legs may be formed by projecting a part of the walls 24, 25, and 26 in the axial direction. The plurality of legs may be fixed to the stator core 11 or the coil end 14 by a fixing mechanism such as adhesion, snap fit, or screwing.

In the above embodiment, the coil terminals 16 and the bus bar unit 20 are illustrated so as to be exposed. Alternatively, the coil terminals 16 and/or the bus bar unit 20 may have a powder coating layer applied to them. The powder coating layer can be provided, for example, so as to cover the coil terminals 16, the joints 17 and 18 and the terminal members 31 and 32. The powder coating layer may cover the entire coil end 14. The powder coating layer may cover the bus bar unit 20.

What is claimed is:
1. A stator of a rotary electric machine, comprising:
a stator core which provides a plurality of slots; and
a stator coil mounted on a stator core, the stator coil comprising:
a coil end positioned at an end of the stator core;

bus bars made of conductive members electrically connected to coil terminals included in the coil end; and a holder, which is a container made of an insulating member for accommodating the bus bars, is arranged in an axial direction of the stator core, and has an opening facing the stator core, wherein the holder comprises a plurality of partition walls between an outer wall and an inner wall of the holder, the bus bars include a plurality of phase bus bars each having two partial bus bars, each one of the partial bus bars has dispersive terminal members electrically connected to the coil terminals and a collective terminal member electrically connected to a power terminal, all terminal members including the dispersive terminal members and the collective terminal member extend towards a radial direction outside from the opening of the holder, the dispersive terminal members are disposed on a first end region of each one of the partial bus bars and are circumferentially adjacent to each other, and the collective terminal member is disposed on a second end region of each one of the partial bus bars.

2. The stator of a rotary electric machine according to claim 1, wherein each one of the bus bars has a main member extending in a circumferential direction, the holder has a groove deeper than a height of the main member, the opening is also an opening of the groove, and the opening and the stator core face each other.

3. The stator of a rotary electric machine according to claim 1, wherein the holder is arranged outer side than the coil end in an axial direction or outer side than the coil end in a radial direction.

4. The stator of a rotary electric machine according to claim 1, further comprising:

an insulating resin member applied to the opening.

5. The stator of a rotary electric machine according to claim 4, wherein the holder is made of resin, and the insulating resin member is made of a soft resin which is softer than the resin forming the holder.

6. The stator of a rotary electric machine according to claim 4, wherein the insulating resin member includes an adhesive resin member adhering each one of the bus bars and the holder.

7. The stator of a rotary electric machine according to claim 4, wherein the insulating resin member embeds the bus bars in the opening of the holder.

8. The stator of a rotary electric machine according to claim 4, wherein the terminal members extend from a surface of the insulating resin member.

9. The stator of a rotary electric machine according to claim 4, wherein the insulating resin member is a potting resin.

10. The stator of a rotary electric machine according to claim 9, wherein the holder has a first wall positioned in a radial direction inside and a second wall positioned in a radial direction outside, and the potting resin has a surface lower than apexes of the first wall and the second wall.

11. The stator of a rotary electric machine according to claim 9, wherein the holder has a first wall positioned in a radial direction most inside and a second wall positioned in a radial direction most outside, and the potting resin has a surface lower than apexes of the first wall and the second wall.

12. The stator of a rotary electric machine according to claim 4, wherein the insulating resin member is a thermosetting resin.

13. The stator of a rotary electric machine according to claim 1, wherein the holder is a resin molded product molded by injection molding.

14. A rotary electric machine comprising:

the stator of the rotary electric machine according to claim 1;

a rotor magnetically coupled to the stator; and a housing which accommodates the stator and the rotor and faces a wall surface of the holder.

15. The stator of the rotary electric machine according to claim 1, wherein each of the partition walls has a thickness in a radial direction thicker than a thickness of each of the outer wall and the inner wall in the radial direction.

16. The stator of the rotary electric machine according to claim 1, wherein the two partial bus bars including the dispersive terminal members and the collective terminal member are arranged in a line symmetry.

* * * * *